US008863096B1

(12) United States Patent
Bucur et al.

(10) Patent No.: US 8,863,096 B1
(45) Date of Patent: Oct. 14, 2014

(54) PARALLEL SYMBOLIC EXECUTION ON CLUSTER OF COMMODITY HARDWARE

(75) Inventors: Stefan Bucur, Lausanne (CH); Cristian Zamfir, Prilly (CH); George Candea, Saint-Sulpice (CH)

(73) Assignee: École Polytechnique Fédérale de Lausanne (EPFL), Lausanne (CH)

( * ) Notice: Subject to any disclaimer, the term of this patent is extended or adjusted under 35 U.S.C. 154(b) by 258 days.

(21) Appl. No.: 13/345,585

(22) Filed: Jan. 6, 2012

Related U.S. Application Data

(60) Provisional application No. 61/430,191, filed on Jan. 6, 2011.

(51) Int. Cl.
G06F 9/44 (2006.01)
G06F 9/45 (2006.01)
G06F 9/46 (2006.01)

(52) U.S. Cl.
USPC ........... 717/135; 717/124; 717/126; 717/128; 717/131; 717/139; 717/156; 718/104; 718/106

(58) Field of Classification Search
CPC ............ G06F 11/3608; G06F 11/3612; G06F 11/3624; G06F 11/3636; G06F 9/44589; G06F 17/505; G06F 8/4441
See application file for complete search history.

(56) References Cited

U.S. PATENT DOCUMENTS

| | | | |
|---|---|---|---|
| 6,742,177 B1 * | 5/2004 | Dorak et al. ................... | 717/124 |
| 6,745,384 B1 * | 6/2004 | Biggerstaff ................... | 717/156 |
| 8,209,667 B2 * | 6/2012 | Eisner et al. ................... | 717/126 |
| 8,458,675 B1 * | 6/2013 | Hinkle et al. .................. | 717/139 |
| 8,510,722 B2 * | 8/2013 | Yang et al. ..................... | 717/131 |
| 2007/0168988 A1 * | 7/2007 | Eisner et al. ................... | 717/126 |
| 2008/0209436 A1 * | 8/2008 | Agha et al. ..................... | 718/106 |
| 2010/0125832 A1 * | 5/2010 | Prasad et al. .................. | 717/124 |
| 2010/0281469 A1 * | 11/2010 | Wang et al. .................... | 717/128 |
| 2011/0078666 A1 * | 3/2011 | Altekar .......................... | 717/131 |
| 2012/0110589 A1 * | 5/2012 | Ghosh et al. .................. | 718/104 |

OTHER PUBLICATIONS

Barnat, J., et al., "Scalable Multi-core LTL Model-Checking," In Intl. SPIN Workshop, 2007, pp. 187-203.
Boonstoppel, P., et al., "RWset: Attacking Path Explosion in Constraint-Based Test Generation," In Intl. Conf. on Tools and Algorithms for the Construction and Analysis of Systems, 2008, 16 Pages.

(Continued)

*Primary Examiner* — Don Wong
*Assistant Examiner* — Anibal Rivera
(74) *Attorney, Agent, or Firm* — Fenwick & West LLP

(57) ABSTRACT

A symbolic execution task is dynamically divided among multiple computing nodes. Each of the multiple computing nodes explores a different portion of a same symbolic execution tree independently of other computing nodes. Workload status updates are received from the multiple computing nodes. A workload status update includes a length of a job queue of a computing node. A list of the multiple computing nodes ordered based on the computing nodes' job queue lengths is generated. A determination is made regarding whether a first computing node in the list is underloaded. A determination is made regarding whether a last computing node in the list is overloaded. Responsive to the first computing node being underloaded and the last computing node being overloaded, a job transfer request is generated that instructs the last computing node to transfer a set of one or more jobs to the first computing node.

16 Claims, 17 Drawing Sheets

(56) References Cited

OTHER PUBLICATIONS

Bucur, S., et al., "Parallel Symbolic Execution for Automated Real-World Software Testing," Proceedings of the 6th ACM SIGOPS/EuroSys Conference on Computer Systems, Apr. 10-13, 2011, Salzburg, Austria, pp. 1-15.
Cadar, C., et al., "EXE: Automatically Generating Inputs of Death," In Conf. on Computer and Communication Security, Oct. 30-Nov. 3, 2006, 14 Pages.
Cadar, C., et al., "KLEE: Unassisted and Automatic Generation of High-Coverage Tests for Complex Systems Programs," In Symp. on Operating Systems Design and Implementation, 2008, pp. 1-16.
Ciortea, L., et al., "Cloud9: A Software Testing Service," Proc. 3rd SOSP Workshop on Large Scale Distributed Systems and Middleware (LADIS), Big Sky, MT, Oct. 2009, pp. 1-6.
Godefroid, P., et al., "Automated Whitebox Fuzz Testing," In Network and Distributed System Security Symposium, 2008, 16 Pages.
Godefroid, P., "Compositional Dynamic Test Generation," In Symp. on Principles of Programming Languages, Jan. 17-19, 2007, 8 Pages.
Godefroid, P., et al., "DART: Directed Automated Random Testing," In Conf. on Programming Language Design and Implementation, Jun. 12-15, 2005, 11 Pages.
Godefroid, P., "Model Checking for Programming Languages using VeriSoft," Proceedings of the 24th ACM Symposium on Principles of Programming Languages, Paris, Jan. 1997, 14 Pages.
Grumberg, O., et al., "A Work-Efficient Distributed Algorithm for Reachability Analysis," Formal Methods in System Design, 2006, 13 Pages, vol. 29, No. 2.
Holzmann, G., et al., "Multi-Core Model Checking with SPIN," In Intl. SPIN Workshop, 2008, pp. 1-8.
Holzmann, G., et al., "Tackling Large Verification Problems with the Swarm Tool," In Intl. SPIN Workshop, 2008, pp. 1-8.
Kumar, R., et al., "Load Balancing Parallel Explicit State Model Checking," In Intl. Workshop on Parallel and Distributed Methods in Verification, 2004, pp. 1-16.
Lerda, F., et al., "Distributed-Memory Model Checking with SPIN," In Intl. SPIN Workshop, 1999, 18 Pages.
Majumdar, R., et al., "Hybrid Concolic Testing," 29th International Conference on Software Engineering (ICSE'07), 2007, 10 Pages.
Misailović, S., et al., "Parallel Test Generation and Execution with Korat," In Symp. on the Foundations of Software Eng., Sep. 3-7, 2007, 10 Pages.
Staats, M., et al., "Parallel Symbolic Execution for Structural Test Generation," In Intl. Symp. on Software Testing and Analysis, Jul. 12-16, 2010, pp. 183-193.
Stern, U., et al., "Parallelizing the Murphi Verifier," In Intl. Conf. on Computer Aided Verification, 1997, pp. 256-267.

\* cited by examiner

```
typedef struct {
  wlist_id_t wlist;
  char taken;
  unsigned int owner;
  unsigned int queued;
} mutex_data_t;

int pthread_mutex_lock(pthread_mutex_t *mutex) {
  mutex_data_t *mdata = ((mutex_data_t**)mutex);
  if (mdata->queued > 0 || mdata->taken) {
    mdata->queued++;
    cloud9_thread_sleep(mdata->wlist);
    mdata->queued--;
  }
  mdata->taken = 1;
  mdata->owner = pthread_self();
  return 0;
} int pthread_mutex_unlock(pthread_mutex_t *mutex) {
  mutex_data_t *mdata = ((mutex_data_t**)mutex);
  if (!mdata->taken ||
      mdata->owner != pthread_self()) {
    errno = EPERM;
    return -1;
  }
  mdata->taken = 0;
  if (mdata->queued > 0)
    cloud9_thread_notify(mdata->wlist);
  return 0;
}
```

FIG. 11

```
void write( int x )
{
  if (x < MAX) {
    if (x > 0)
      ...
    else
      ...
  } else {
    if (x > 3)
      ...
    else
      ...
  }
}
```

PARALLEL SYMBOLIC EXECUTION ON CLUSTER OF COMMODITY HARDWARE

RELATED APPLICATION

This application claims the benefit of U.S. Provisional Application No. 61/430,191, filed on Jan. 6, 2011, entitled "Parallel Automated Testing Platform for Software Systems."

BACKGROUND

1. TECHNICAL FIELD

The invention generally relates to the field of automated software testing and in particular to parallel symbolic execution of a target program using a cluster of commodity hardware.

2. Background Information

Symbolic execution is an automated technique for testing software programs. Instead of executing a target program with regular concrete inputs (e.g., x=5), symbolic execution executes a target program with "symbolic" inputs that can take on all values allowed by the type (e.g., x=$\lambda$, where $\lambda \in N$, and N is the set of all numbers). Whenever a conditional branch is encountered that involves a predicate $\pi$ that depends (directly or indirectly) on x, state and execution are forked into two alternatives: one following the then-branch ($\pi$) and another following the else-branch ($\neg \pi$). The two executions can now be pursued independently. This approach is efficient because it analyzes code for entire classes of inputs rather than specific ("concrete") inputs. When a failure point (e.g., a "bug") is found, a test generator can compute concrete values for target program inputs that take the program to the bug location. A "symbolic test" specifies families of inputs and environment behaviors for which to test a target program. By encompassing entire families of behaviors, symbolic tests cover substantially more test cases than "concrete" regular tests. Also, a symbolic test enables environment conditions to be reproduced which otherwise would have been very difficult or impossible to set up with regular test cases.

In order to test a target program using symbolic execution, a symbolic execution engine (SEE) executes the target program with unconstrained symbolic inputs. When an execution branch involves symbolic values, execution forks into two separate executions, each with a corresponding clone of the program state. Symbolic values in the clones are constrained to make the branch condition (e.g., $\lambda$<MAX) evaluate to false (e.g., $\lambda \geq$MAX) or true (e.g., $\lambda$<MAX). Execution recursively splits into sub-executions at each subsequent branch, turning an otherwise linear execution into an execution tree. FIG. 13A is a listing of pseudocode illustrating an example of a target program. FIG. 13B is a symbolic execution tree corresponding to the listing of pseudocode in FIG. 13A.

In this way, all execution paths in the target program are explored. To ensure that only feasible paths are explored, the SEE uses a constraint solver to check the satisfiability of each branch's predicate, and the SEE follows only satisfiable branches. If a bug is encountered (e.g., a crash or a hang) along one of the paths, then the solution to the constraints accumulated along that path yields the inputs that take the target program to the bug. These inputs constitute a test case.

One of the challenges faced by symbolic testing is scalability. The phenomenon of "path explosion" refers to the fact that the number of paths through a program is roughly exponential in program size. Since the size of an execution tree is exponential in the number of branches, and the complexity of constraints increases as the tree deepens, state-of-the-art SEEs can quickly bottleneck on limited computing resources (e.g., central processing unit (CPU) cycles and memory), even for target programs that have only a few thousand lines of code (KLOC). Path explosion severely limits the extent to which large software programs can be thoroughly tested. One must be content with either a low percentage of code coverage for large programs or using symbolic execution tools with only small programs.

SUMMARY

The above and other issues are addressed by a computer-implemented method, non transitory computer-readable storage medium, and computer system for dynamically dividing a symbolic execution task among multiple computing nodes, wherein each of the multiple computing nodes explores a different portion of a same symbolic execution tree independently of other computing nodes. An embodiment of the method comprises receiving workload status updates from the multiple computing nodes. A workload status update includes a length of a job queue of a computing node. The method further comprises generating a list of the multiple computing nodes ordered based on the computing nodes' job queue lengths; determining whether a first computing node in the list is underloaded; and determining whether a last computing node in the list is overloaded. The method further comprises responsive to the first computing node being underloaded and the last computing node being overloaded, generating a job transfer request that instructs the last computing node to transfer a set of one or more jobs to the first computing node; and sending the job transfer request to the first computing node and the last computing node.

An embodiment of the medium stores executable computer program instructions for dynamically dividing a symbolic execution task among multiple computing nodes, wherein each of the multiple computing nodes explores a different portion of a same symbolic execution tree independently of other computing nodes. The instructions receive workload status updates from the multiple computing nodes. A workload status update includes a length of a job queue of a computing node. The instructions further generate a list of the multiple computing nodes ordered based on the computing nodes' job queue lengths; determine whether a first computing node in the list is underloaded; and determine whether a last computing node in the list is overloaded. The instructions further generate, responsive to the first computing node being underloaded and the last computing node being overloaded, a job transfer request that instructs the last computing node to transfer a set of one or more jobs to the first computing node; and send the job transfer request to the first computing node and the last computing node.

An embodiment of the computer system for dynamically dividing a symbolic execution task among multiple computing nodes, wherein each of the multiple computing nodes explores a different portion of a same symbolic execution tree independently of other computing nodes, comprises at least one non-transitory computer-readable storage medium storing executable computer program instructions. The instructions comprise instructions for receiving workload status updates from the multiple computing nodes. A workload status update includes a length of a job queue of a computing node. The instructions further generate a list of the multiple computing nodes ordered based on the computing nodes' job queue lengths; determining whether a first computing node in the list is underloaded; and determining whether a last computing node in the list is overloaded. The instructions further generate, responsive to the first computing node being underloaded and the last computing node being overloaded, a job transfer request that instructs the last computing node to transfer a set of one or more jobs to the first computing node; and send the job transfer request to the first computing node and the last computing node.

BRIEF DESCRIPTION OF THE DRAWINGS

FIG. 11 is a listing of C code illustrating am example implementation of pthread mutex operations in the POSIX environment model.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
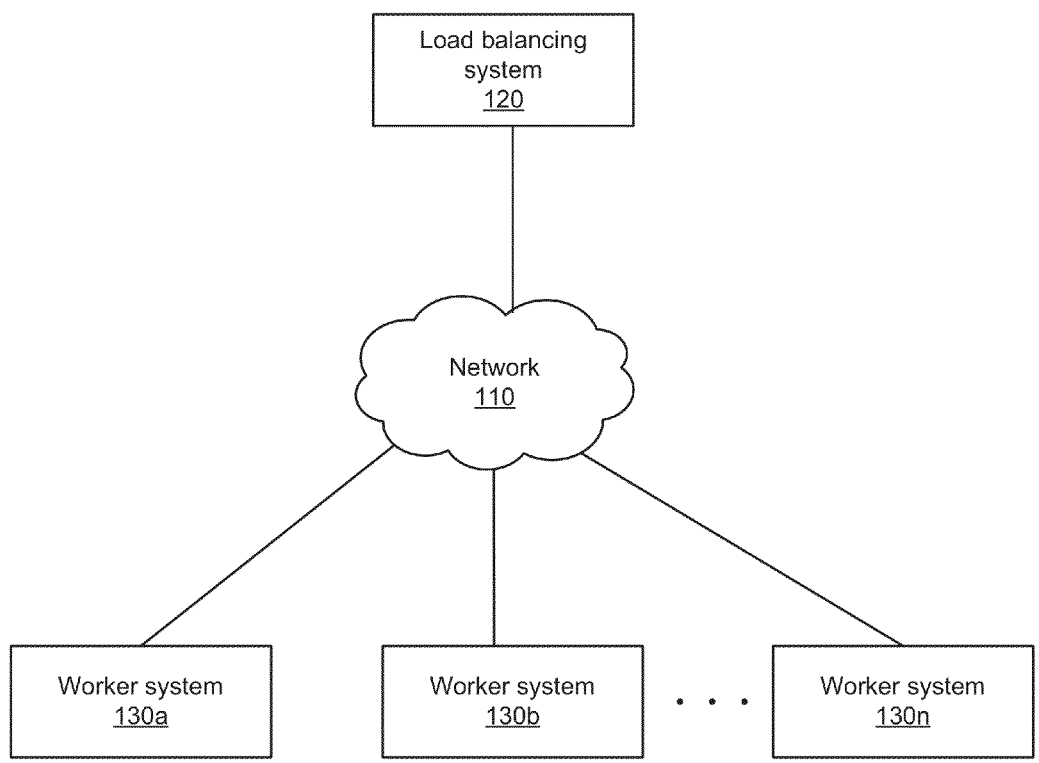
FIG. 1 is a high-level block diagram illustrating an environment for parallel symbolic execution of a target program according to one embodiment.

FIG. 1 is a high-level block diagram illustrating an environment 100 for parallel symbolic execution of a target program according to one embodiment. The environment 100 symbolically executes a target program in parallel. One way to symbolically execute a target program in parallel is by using a classic single-computing-node symbolic execution engine (SEE) on a single computer that has sufficient computing resources (e.g., central processing unit (CPU) cycles and memory). Since large amounts of CPU and memory are required, the single computer must be a supercomputer with vast shared memory to store the entire symbolic execution state and CPUs accessing the state using high-speed interconnects and governed by appropriate locking mechanisms. Such supercomputers either do not exist today or are prohibitively expensive.

Instead, the environment 100 uses a cluster of commodity hardware. This cluster-based approach harnesses the computing resources of the individual commodity machines ("computing nodes") into a "distributed computer" whose aggregate CPU and memory surpass that of a standard individual machine. The computing nodes can include single-core machines and/or multi-core machines. Cluster-based parallel symbolic execution provides the illusion of running a classic SEE on top of a large, powerful computer. Without changing the exponential nature of the problem, parallel symbolic execution harnesses cluster resources to make it feasible to perform symbolic testing on large programs. The cluster can be, for example, a private cluster or a cloud infrastructure (e.g., the Elastic Compute Cloud (EC2) web service from Amazon or the Eucalyptus cloud computing platform from Eucalyptus).

In the environment 100, each computing node in the cluster has direct access to its own local memory. Since the computing nodes do not have access to any shared memory, the cluster is referred to as "shared-nothing," and the computing nodes communicate explicitly with each other to exchange information. Parallelizing symbolic execution on a large shared-nothing cluster in a way that scales well is difficult. The environment 100 provides cluster-based parallel symbolic execution that scales linearly with the number of commodity machines ("computing nodes") in the system. Specifically, the environment 100 provides a parallel SEE that executes on a commodity cluster. Since the execution scales linearly, a user is able to "throw hardware at the problem."

The environment 100 may be maintained by an enterprise that facilitates software testing, such as a corporation, university, or government agency. As shown, the environment 100 includes a network 110, a load balancing system 120, and multiple worker systems 130 (130a, 130b, . . . , 130n). Together, the network 110, the load balancing system 120, and the worker systems 130 form a platform for parallel symbolic execution of a target program. While only one load balancing system 120 is shown in the embodiment depicted in FIG. 1 for clarity, other embodiments can have multiple load balancing systems 120. Also, while only three worker systems 130 are shown in the embodiment depicted in FIG. 1 for clarity, other embodiments can have other numbers of worker systems 130.

The network 110 represents the communication pathway between the load balancing system 120 and the worker systems 130 and between the worker systems 130 themselves. In one embodiment, the network 110 uses standard communications technologies and/or protocols and can include the Internet. Thus, the network 110 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 110 can include muitiprotocol label switching (MPLS), transmission control protocol/Internet protocol (TCP/IP), User Datagram Protocol (MP), hypertext transport protocol (HTTP), simple mail transfer protocol (SMTP), file transfer protocol (FTP), etc. The data exchanged over the network 110 can be represented using technologies and/or formats including image data in binary form (e.g. Portable Network Graphics (PNG)), hypertext markup language (HTML), extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities on the network 110 can use custom and/or dedicated data communications technologies instead of, or in addition to, the ones described above. Custom and/or dedicated data communications technologies include, for example, shared storage (e.g., a shared storage server), a cloud-based server, and a bug database.

The load balancing system 120 divides a symbolic execution task among worker systems 130 ("computing nodes"), which then explore the execution tree independently of each other (referred to as "distributed exploration"). One way to divide the task is to statically split the execution tree and farm off subtrees to computing nodes. However, the contents and shape of the execution tree are not known until the tree is actually explored, and finding a balanced partition (i.e., one that will keep all computing nodes busy) of an unexpanded execution tree is undecidable. Besides subtree size, the amount of computing resources (e.g., CPU and memory) required to explore a subtree is also undecidable, yet must be taken into account when partitioning the tree. When running on large target programs, this approach leads to high workload imbalance among computing nodes, making the entire cluster proceed at the pace of the slowest computing node. If this computing node gets stuck (e.g., while symbolically executing a loop), then the testing process may never terminate.

Instead, the load balancing system 120 partitions the execution tree dynamically, as the tree is being explored by the worker systems 130. In one embodiment, the load balancing system 120 dynamically partitions the execution tree such that the parts are disjoint (to avoid redundant work) and together they cover the global execution tree (for exploration to be complete). One side effect of dynamic partitioning is the transparent handling of fluctuations in resource quality, availability, and cost, which are inherent to large clusters (e.g., in cloud settings).

The load balancing system 120 receives status updates on the worker systems' workloads. As needed, the load balancing system 120 instructs pairs of worker systems 130 to balance each other's workloads. In one embodiment, the load balancing system 120 attempts to minimize the number of work transfers and associated communication overhead. The load balancing system 120 is a computer (or set of computers) that stores one or more processing modules and/or one or more data repositories and is further described below with reference to FIGS. 3 and 8.

A worker system 130 explores the execution tree independently of other worker systems 130. Specifically, each worker system 130 explores a portion of the execution tree using an independent SEE (symbolic execution module 490). A worker system 130 sends status updates on its workload to the load balancing system 120. A worker system 130 receives instructions from the load balancing system 120 to balance its workload relative to another worker system 130. Encoding and transfer of work is handled directly by the two involved worker systems 130, without intervention by the load balancing system 120. A worker system 130 is a computer (or set of computers) that stores one or more processing modules and/ or one or more data repositories and is further described below with reference to FIGS. 4 and 8.

Figure 2:
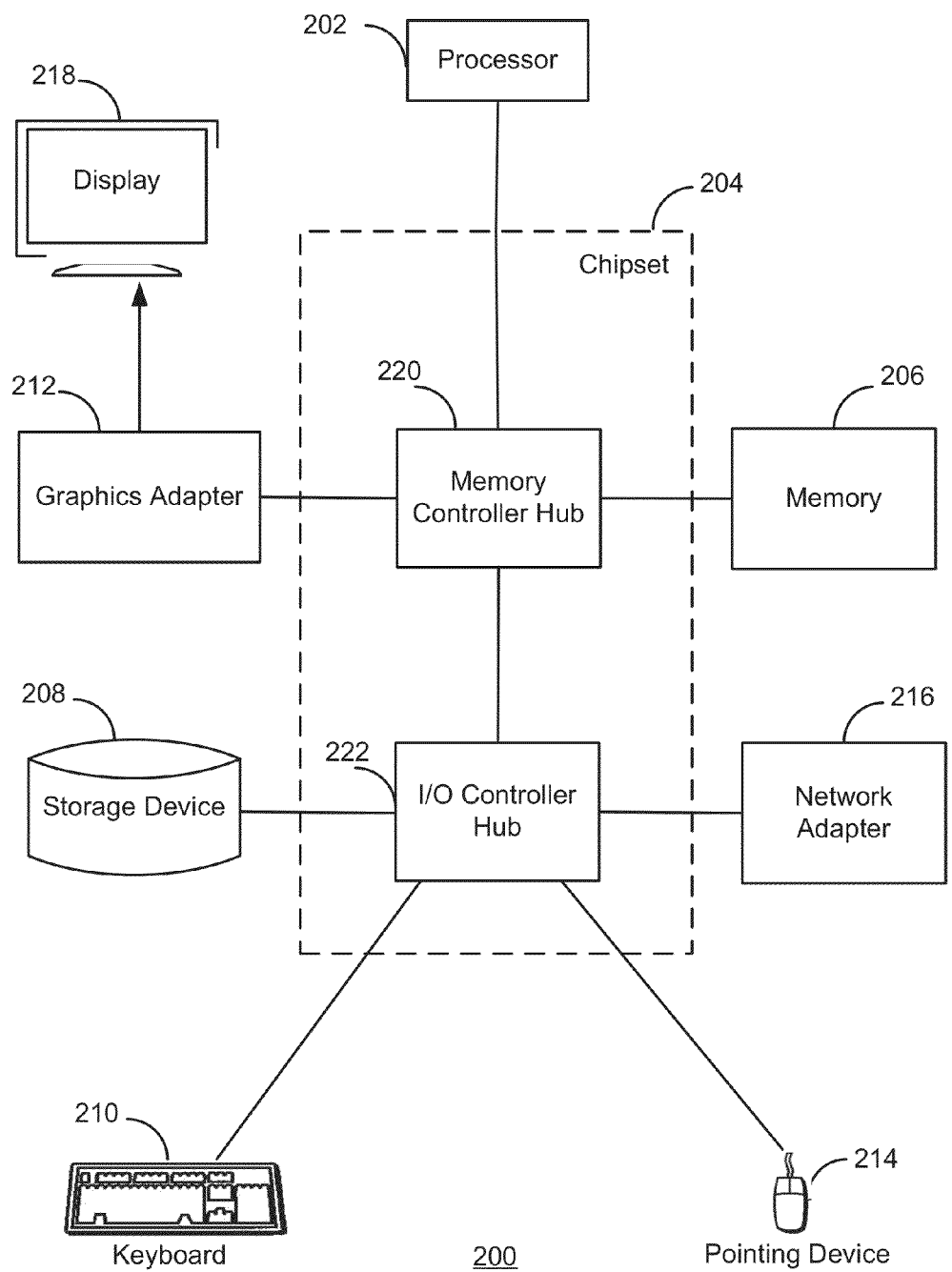
FIG. 2 is a high-level block diagram illustrating an example of a computer for use as one or more of the entities illustrated in FIG. 1, according to one embodiment.

FIG. 2 is a high-level block diagram illustrating an example of a computer for se as one or more of the entities illustrated in FIG. 1, according to one embodiment. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 213 displays images and other information on the display device 218. In some embodiments, the display device 218 includes a touch screen capability for receiving user input and selections. The network adapter 216 couples the computer system 200 to the network 110. Some embodiments of the computer 200 have different and/of other components than those shown in FIG. 2. For example, the load balancing system 120 and/or the worker systems 130 can be formed of multiple blade servers and lack a display device, keyboard, and other components.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
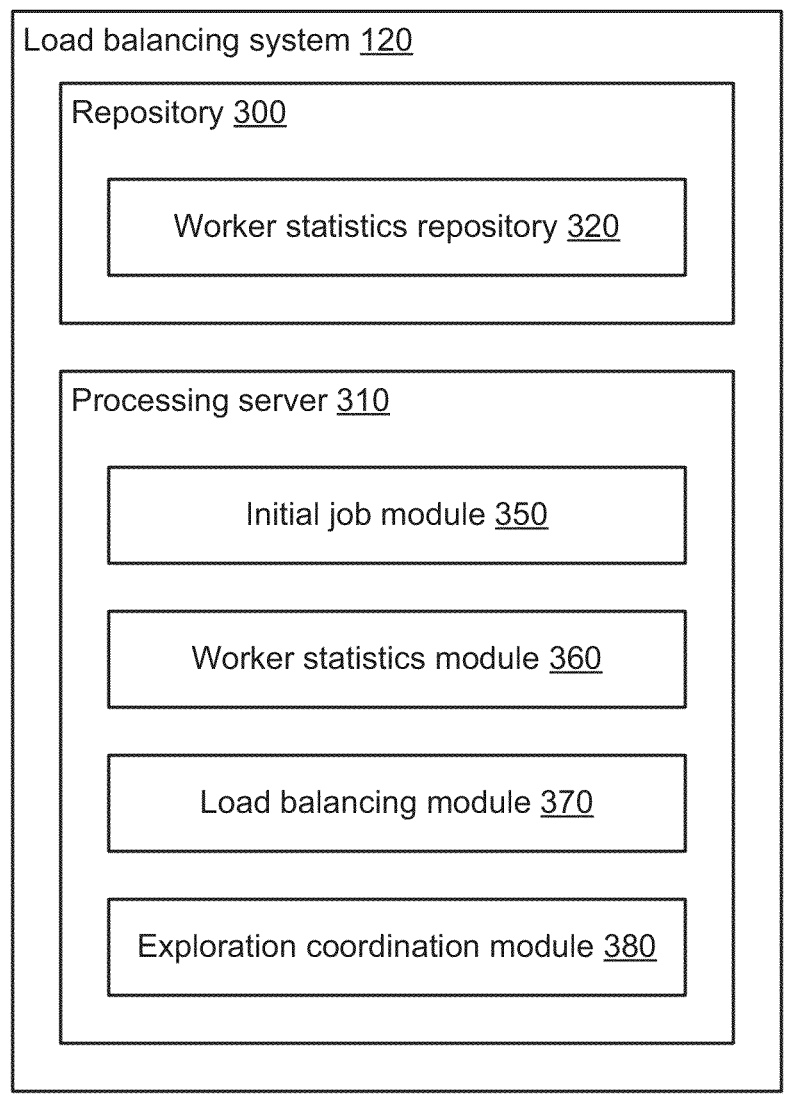
FIG. 3 is a high-level block diagram illustrating a detailed view of a load balancing system, according to one embodiment.

FIG. 3 is a high-level block diagram illustrating a detailed view of the load balancing system 120, according to one embodiment. The load balancing system 120 includes a repository 300 and a processing server 310. The repository 300 is a computer (or set of computers) that stores a worker statistics repository 320. In one embodiment, the repository 300 includes a server that provides the processing server 310 access to the worker statistics repository 320 in response to requests.

The worker statistics repository 320 stores statistics on the worker systems' exploration progress. A worker system 130 maintains a queue of exploration jobs, each of which represents an unexplored subtree. In one embodiment, the statistics stored in the worker statistics repository 320 include lengths (e.g., numbers of jobs) of various worker systems' job queues.

The processing server 310 includes various modules such as an initial job module 350 for sending an initial "seed" job to a worker system 130, a worker statistics module 360 for storing worker system statistics, a load balancing module 370 for instructing pairs of worker systems 130 to balance each other's workloads, and an exploration coordination module 380 for coordinating worker system-level explorations. In one embodiment, the processing server 310 includes a computer (or set of computers) that communicates with the repository 300 and processes data (e.g., by executing the initial job module 350, the worker statistics module 360, and the load balancing module 370).

The initial job module 350 sends an initial "seed" job to a worker system 130. For example, a load balancing system 120 starts execution and is eventually contacted by a first worker system 130. In response to this contact, the initial job module 350 sends an initial seed job to that worker system 130. This initial seed job includes instructions to explore the entire execution tree. The initial seed job will be further discussed below with reference to the initial contact module 460.

The worker statistics module 360 stores worker system statistics in the worker statistics repository 320. For example, the worker statistics module 360 receives a status update from a worker system 130 regarding that worker system's workload and stores the appropriate statistics in the worker statistics repository 320 (e.g., the length of that worker system's job queue).

The load balancing module 370 instructs one or more pairs of worker systems 130 to balance each other's workloads. For example, the load balancing module 360 accesses worker statistics stored in the worker statistics repository 320, analyzes these statistics, and instructs one or more pairs of worker systems 130 to balance each other's workloads as needed. In one embodiment, the load balancing module 370 operates as follows:

The lengths $l_i$ of each worker system $W_i$'s job queue $Q_i$ are obtained from the worker statistics repository 320. The $W_i$ are sorted according to their queue length $l_i$ and placed in a list. The average $\bar{l}$ and standard deviation $\sigma$ of the $l_i$ values are computed. Each $W_i$ is classified as underloaded ($l_i<\max\{\bar{l}-\delta\cdot\sigma, 0\}$), overloaded ($l_i>\bar{l}+\delta\cdot\sigma$), or okay otherwise. ($\delta$ is a constant factor.) One or more underloaded worker systems 130 from the beginning of the list are matched with one or more overloaded worker systems 130 from the end of the list, thereby forming one or more pairs $<W_i, W_j>$ where $W_i$ is underloaded and $W_j$ is overloaded. For each pair $<W_i, W_j>$, with $l_i<l_j$, a job transfer request is sent to the worker systems 130 $W_i$, $W_j$ to move $(l_j-l_i)/2$ candidate tree nodes from $W_j$ to $W_i$. (Candidate tree nodes are discussed below with reference to exploration state 450.) In this embodiment, the load balancing module 370 dynamically partitions a symbolic execution tree and ensures that worker systems' job queue lengths stay within same order of magnitude. A job transfer request can be in the form <source worker system, destination worker system, number of jobs>.

The load balancing module 370 is executed periodically. The load balancing module 370 can be executed more often or less often, as desired. In general, the more frequently the load balancing module 370 is executed, the less chance there is of having a worker system 130 run out of work to perform. In one embodiment, the load balancing module 370 is executed after the worker statistics repository 320 has been updated to reflect a job transfer initiated by the previous execution of the load balancing module 370.

In one embodiment, the load balancing module 370 is executed after every other iteration of worker system status updates (i.e., after every two iterations), where an iteration of status updates includes receiving one status update from each worker system 130. (Note that during one iteration, a worker system 130 can send multiple status updates while the load balancing system 120 is waiting for status updates from other worker systems 130. In that situation, only the status update most recently received by the load balancing system 120 is considered.) Waiting for two iterations ensures that the status updates reflect all of the job transfers initiated by the previous execution of the load balancing module 370.

In one embodiment, if the load balancing system 120 decides that worker system 130A needs to transfer a job to worker system 130B, then the load balancing system 120 informs worker system 130A of this decision as a response to the next status update received from worker system 130A. In response, worker system 130A initiates a connection to worker system 130B to perform the job transfer. Worker system 130A does not send any other status updates to the load balancing system 120 before it finishes the job transfer. Worker system 130B, on the other side, continues sending status updates to the load balancing system 120 and uses a separate thread to receive the job front worker system 130A. After the first iteration of updates, worker system 130A will have received the job transfer request and initiated the transfer, while worker system 130B may have sent its update before or after the transfer (and thus cause the set of transferred jobs to be reported both by worker system 130A and worker system 130B). After the second iteration, worker system 130A and worker system 130B will both report the correct new values. These values enable the load balancing module 370 to properly execute its decision algorithm again.

The exploration coordination module 380 coordinates worker system-level explorations. Classic symbolic execution relies on heuristics to choose which state on an exploration frontier to explore first, so as to efficiently reach a chosen test goal (e.g., code coverage or finding a particular type of bug). In a distributed setting, like environment 100, local heuristics are coordinated across worker systems 130 to achieve a global goal, while keeping communication overhead at a minimum. In one embodiment, the exploration coordination module 380 ensures that eventually all paths in the execution tree are explored. In another embodiment, the exploration coordination module 380 aids in focusing on the execution paths desired by the global strategy. In this sense, the exploration strategies represent policies.

Global strategies are implemented in the environment 100 using a strategy interface for building "overlays" on the execution tree structure. In one embodiment, the strategy interface implements distributed versions of strategies that come with the KLEE symbolic execution tool. KLEE was developed at Stanford University and built on top of the LLVM low-level intermediate representation and compiler framework. The strategy interface can also be available to users of the environment 100.

For example, in one embodiment, a global strategy is built as follows: A code-coverage-optimized strategy drives exploration so as to maximize code coverage. In the environment 100, code coverage is represented as a bit vector, with one bit per line of code. A set bit indicates that a line is covered. If a worker system 130 explores a program state, the worker system 130 sets the corresponding bits locally. The current version of the local bit vector is appended to the status update sent to the load balancing system 120, thereby notifying the load balancing system 120 of the worker system's current progress in terms of code coverage. The load balancing system 120 maintains the current global coverage vector. If the load balancing system 120 receives an updated coverage bit vector, the load balancing system 120 logically "OR"s the updated coverage bit vector into the current global coverage vector. The resulting vector is then sent back to the worker system 130, which in turn logically "OR"s this global bit vector into its own local bit vector, in order to enable the worker system's local exploration strategy to make choices consistent with the global goal. The code coverage bit vector is an example of an overlay data structure.

The strategy interface is further discussed below with reference to "strategy portfolios" and "class-uniform path analysis."

Figure 4:
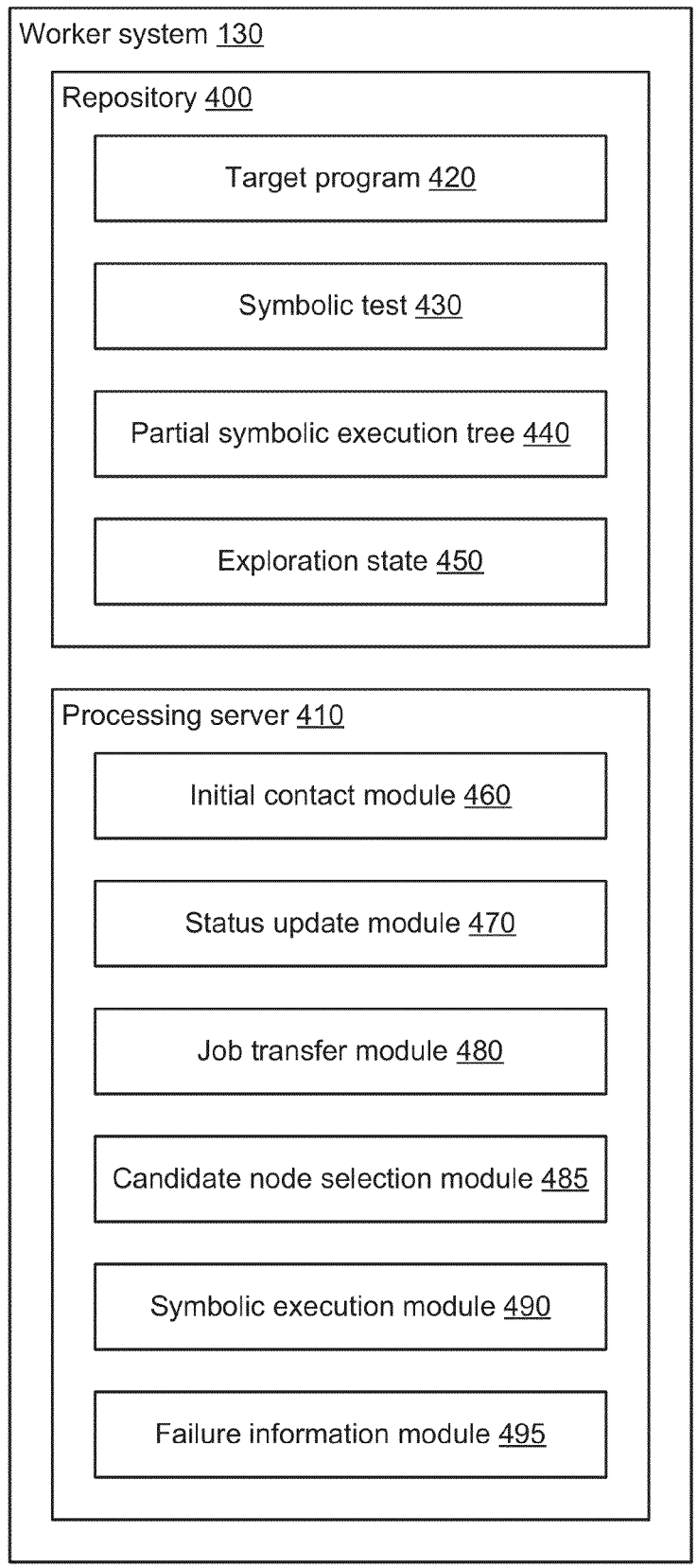
FIG. 4 is a high-level block diagram illustrating a detailed view of a worker system, according to one embodiment.

FIG. 4 is a high-level block diagram illustrating a detailed view of the worker system 130, according to one embodiment. The worker system 130 includes a repository 400 and a processing server 410. The repository 400 is a computer (or set of computers) that stores a target program 420, a symbolic test 430, a partial symbolic execution tree 440, and exploration state 450. In one embodiment, the repository 400 includes a server that provides the processing server 410 access to the target program 420, the symbolic test 430, the partial symbolic execution tree 440, and the exploration state 450 in response to requests.

The target program 420 is a software program. The environment 100 enables a target program 420 to be tested automatically using symbolic execution that is performed in parallel. The target program 420 can be single-threaded, multi-threaded, or distributed. In one embodiment, the target program 420 is loaded into a worker system 130 from a network file system (not shown). In another embodiment, the target program 420 is sent from the load balancing system 120 to a worker system 130 if the worker system 130 joins the cluster. The target program 420 can be stored as executable code (e.g., native binary code).

The symbolic test 430 specifies families of program inputs and environment behaviors for which to test the target program 420. The environment 100 enables a symbolic test 430 to be applied to a target program 420. A symbolic test 430 resembles a classic unit test in the sense that they are both code portions that exercise the functionality of a target program 420 and check for some properties (e.g., through the use of assertions). A symbolic test 430 differs from a classic unit test in various aspects: (1) A symbolic test 430 uses a special API to mark parts of the target program 420 input as symbolic (and thus allow multiple paths through the target program to be explored) and/or to control the behavior of the target program's environment. (2) A symbolic test 430 is compiled, together with the target program 420, into a special format that is passed to the SEE. (3) A symbolic test 430 requires more resources than a classic unit test (e.g., it executes for a longer period of time and requires larger computational power) and is time-bounded. In one embodiment, the symbolic test 430 programmatically controls fine-grained aspects of the executing target program's environment and/or orchestrates environment-related events. For example, the symbolic test 430 injects faults at the boundary between the target program 420 and its environment and/or controls target program thread schedules.

A symbolic test 430 is executed by a worker system 130 (specifically, by a symbolic execution module 490). Symbolic tests are usually written in the programming language of the target program and are executed as a suite (e.g., periodically, during and after the development phase). The resulting format of a symbolic test is specific to the SEE. In one embodiment, the symbolic test 430 adheres to the LLVM format.

In one embodiment, the symbolic test 430 is loaded into a worker system 130 from a network file system (not shown). In another embodiment, the symbolic test 430 is sent from the load balancing system 120 to a worker system 130 if the worker system 130 joins the cluster. The symbolic test 430 can be stored as executable code (e.g., native binary code).

The partial symbolic execution tree 440 is a partial view of a global symbolic execution tree. A partial view reveals only a portion of the global symbolic execution tree. The partial view is a "subtree" of the global tree in the sense that there is an inclusion relationship between the partial view's tree nodes and the global tree's tree nodes. The partial symbolic execution tree 440 has been assigned to a worker system 130 to be explored. A worker system's partial symbolic execution tree 440 includes the root of the global execution tree. A worker system's knowledge is limited to the partial symbolic execution tree 440 that the worker system 130 is exploring locally. As $W_i$ explores and reveals the content of its local partial symbolic execution tree 440, it has no knowledge of $W_j$'s ($i \neq j$) partial symbolic execution tree. Together, all the partial trees of the various worker systems 130 completely map the global tree. In one embodiment, no element in the environment 100 (not even the load balancing system 120) maintains a global execution tree. Recall that disjointness and completeness of the exploration are ensured by the load balancing system 120.

In one embodiment, a symbolic execution tree (or partial view thereof) is stored using two custom data structures: tree node pins and a tree layer. A "tree node pin" is a type of smart pointer customized for trees. Standard smart pointers can introduce significant performance disruptions when used for linked data structures. Chained destructors can introduce noticeable deallocation latency and can even overflow the stack and crash the system. A tree node pin enables a tree to be treated like a "rubber band" data structure. Specifically, as tree nodes get allocated, the rubber band is stretched, and some tree nodes act as pins to anchor the rubber band. When such a pin is removed, the tree nodes with no incoming references are freed up to the point where the rubber band reaches the pin next closest to the root. Tree nodes between two pins are freed all at once, avoiding the use of the stack for recursive destructor calls.

The tree layer is a layer-based structure similar to that used in computer-aided design (CAD) tools, where the actual tree is a superposition of simpler layers. When exploring the tree, one chooses the layer of interest. Switching between layers can be done dynamically at virtually zero cost. In one embodiment, separate layers are used for symbolic states, imported jobs, and other sets of internal information.

The exploration state 450 indicates exploration characteristics regarding the tree nodes of a worker system's partial symbolic execution tree 440. The tree nodes of a worker system's partial symbolic execution tree 440 are characterized as one of three types: (1) internal tree nodes that have already been explored and are thus no longer of interest (referred to as "dead tree nodes"); (2) tree nodes that demarcate the portion being explored, separating the domains of different worker systems 130 (referred to as "fence tree nodes"); and (3) tree nodes that are ready to be explored (referred to as "candidate tree nodes"). A worker system 130 explores only candidate tree nodes. A worker system 130 never explores dead tree nodes or fence tree nodes.

Candidate tree nodes are leaves of the local partial symbolic execution tree 440, and they form the "exploration frontier." The load balancing module 370 ensures that exploration frontiers are disjoint between worker systems 130, thus ensuring that no worker system 130 duplicates the exploration performed by another worker system 130. At the same time, the union of all exploration frontiers in the environment 100 corresponds to the frontier of the global execution tree. As explained above, when the global exploration frontier becomes poorly balanced across worker systems 130, the load balancing module 370 determines a loaded (source) worker $W_s$ and a less loaded (destination) worker $W_d$ and instructs them to balance workload by sending n jobs from $W_s$ to $W_d$, in the extreme, $W_d$ is a new worker system 130 (i.e., a worker system 130 that recently joined the cluster) or a worker system 130 that has finished exploring its partial symbolic execution tree 440 and has zero jobs left.

Regarding tree nodes and jobs, a "tree node" is an element in a symbolic execution tree, while a "job" is the path in the symbolic execution tree that leads to a tree node. The work transferred between worker systems 130 is encoded as a set of one or more jobs. A job can point to a not-yet-existing tree node, in which case the job is replayed by the symbolic execution module 490 (discussed below).

Figure 5:
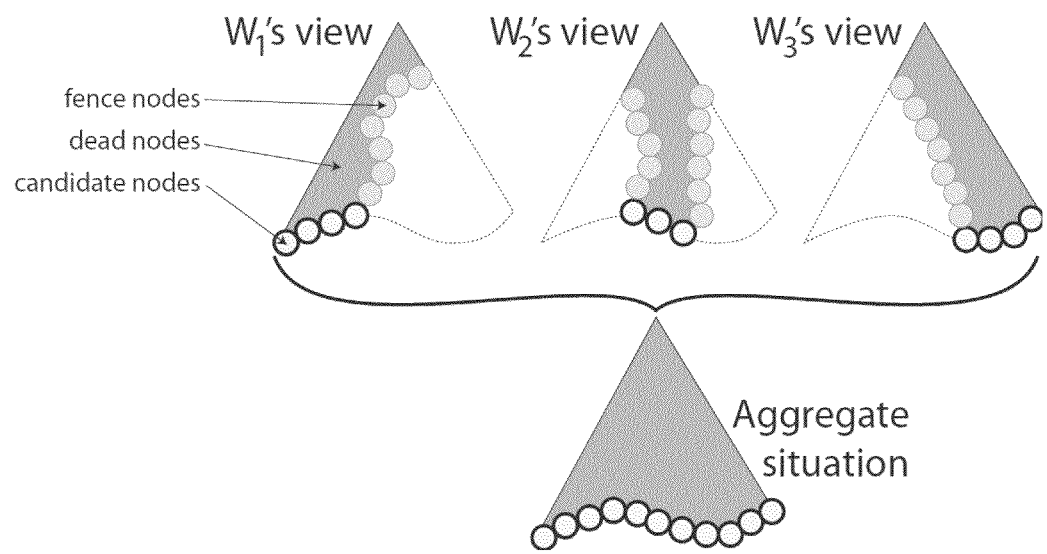
FIG. 5 is a conceptual diagram illustrating exploration state and dynamic partitioning of exploration according to one embodiment.

FIG. 5 is a conceptual diagram illustrating exploration state and dynamic partitioning of exploration according to one embodiment. Specifically, FIG. 5 shows three local views of the same global symbolic execution tree: the view of a first worker system 130 ($W_1$), the view of a second worker system 130 ($W_2$), and the view of a third worker system 130 ($W_3$). FIG. 5 also shows a view of the corresponding global symbolic execution tree.

The processing server 410 includes various modules such as an initial contact module 460 for initially contacting a load balancing system 120, a status update module 470 for sending a status update to a load balancing system 120, a job transfer module 480 for sending or receiving an exploration job, a candidate node selection module 485 for determining a next candidate tree node to explore, a symbolic execution module 490 for symbolically executing a target program, and a failure information module 495 for gathering information regarding a failure. In one embodiment, the processing server 410 includes a computer (or set of computers) that communicates with the repository 400 and processes data (e.g., by executing the initial contact module 460, the status update module 470, the job transfer module 480, the candidate node selection module 485, symbolic execution module 490, and the failure information module 495).

The initial contact module 460 initially contacts a load balancing system 120. For example, a worker system 130 starts execution and uses the initial contact module 460 to initially contact a load balancing system 120. In response to this contact, the worker system 130 can receive 1) an initial seed job (if this contact is the first time that the load balancing system 120 was contacted by any worker system 130) or 2) a job transfer request, or 3) nothing. If this contact is not the first time that the load balancing system 120 was contacted by any worker system 130, then the worker system 130 may or may not receive a job transfer request in response to the initial contact, depending on the implementation of the load balancing algorithm. The job transfer request can be postponed (e.g., until there is sufficient workload in the cluster that the load balancing system 120 can instruct that some of the workload be sent to the worker system 130). For instance, when N worker systems 130 join the cluster, the load balancing system 120 will give the seed job to one of them. During the second load balancing iteration, only the first worker system 130 will have work to give away, and thus only one of the N−1 other worker systems 130 will be selected for job transfer.

Generally speaking, the number of worker systems 130 needed for work transfer starts with 1, and then it doubles after each load balancing iteration, until all the worker systems 130 may be involved in load balancing decisions. Therefore, this process requires a number of iterations logarithmic in the number of worker systems 130 in order to converge.

Recall that an initial seed job includes instructions to explore the entire execution tree. If the worker system 130 receives an initial seed job, then the initial contact module 460 instructs the symbolic execution module 490 (discussed below) to replay the initial seed job until the symbolic execution module 490 obtains the starting tree node (here, the root tree node), thereby starting the exploration from the root tree node in the symbolic execution tree. The initial seed job will be further discussed below with reference to the job transfer module 480.

The status update module 470 sends a status update to a load balancing system 120. The status update includes information regarding that worker system's workload in terms of exploration jobs (e.g., the length of that worker system's exploration job queue). In one embodiment, the status update module 470 sends status updates periodically (e.g., at configurable time intervals).

The job transfer module 480 sends or receives an exploration job. For example, a job transfer module 480 receives from a load balancing system 120 a job transfer request. In one embodiment, the job transfer request includes three pieces of information: an indication of a source worker system 130 ($W_s$), an indication of a destination worker system 130 ($W_d$), and a number of jobs to move (n).

If the job transfer module 480 is part of the source worker system 130 ($W_s$), then the job transfer module 480 determines n of its candidate tree nodes and packages them for transfer to the destination worker system 130 ($W_d$). In one embodiment, the job transfer module 480 determines the n candidate tree nodes randomly from among the candidate tree nodes on the symbolic execution tree's exploration frontier. In another embodiment, the job transfer module 480 determines the first n candidate tree nodes encountered during a depth-first search traversal of the symbolic execution tree. In this embodiment, the n candidate tree nodes belong to the same region in the tree, which minimizes the replay effort (since these tree nodes will share many common paths that will be replayed only once). Since a candidate tree node sent to another worker system 130 is now on the boundary between the work done by $W_s$ and the work done by $W_d$, that candidate tree node becomes a fence tree node at $W_s$ (e.g., as stored in the exploration state 450). This conversion prevents redundant work.

In one embodiment, an exploration job is sent by serializing the "content" of the chosen tree node and sending it to $W_d$. The content of a tree node, which represents an execution state, is maintained by the symbolic execution module 490 (discussed below). The execution state includes the content (symbolic or concrete) of each memory location, the set of processes and threads created (including the program counter and stack of each thread), and the path constraints accumulated up to that execution point. In another embodiment, an exploration job is sent by sending to $W_d$ the path from the root of the global symbolic execution tree to the chosen tree node and relying on $W_d$ to "replay" that path and obtain the contents of the tree node. (Any fence tree nodes that border this path will never be explored.) Choosing one embodiment versus the other is a trade-off between time to encode/decode and network bandwidth. The first embodiment requires little work to decode but consumes bandwidth. (The state of a real target program is typically at least several megabytes.) Encoding a job as a path (i.e., the second embodiment) requires replay on $W_d$. If large commodity clusters are assumed to have abundant CPU but meager bisection bandwidth, then it is better to encode jobs as the path from the root to the candidate tree node (i.e., the second embodiment). As an optimization, common path prefixes can be exploited: jobs are not encoded separately, but rather the corresponding paths are aggregated into a job tree and sent as such.

If the job transfer module 480 is part of the destination worker system 130 ($W_d$), then the job transfer module 480 will receive n of $W_s$'s candidate tree nodes. When an exploration job arrives at $W_d$, it is placed conceptually in a queue (referred to as an "exploration job queue"). If the job transfer module 480 receives a job tree, then the job transfer module 480 imports the job tree into $W_d$'s own partial symbolic execution tree 440, and the leaves of the job tree become part of $W_d$'s frontier (e.g., as stored in the exploration state 450). (At the time of arrival, these tree nodes may lie "ahead" of $W_d$'s frontier.) The tree nodes in the incoming jobs are characterized as virtual tree nodes (as opposed to materialized tree nodes, which reside in the local partial symbolic execution tree 440). Paths are replayed only lazily. A materialized tree node is one that contains the corresponding program state, whereas a virtual tree node is an "empty shell" without corresponding program state. In the common case, the frontier of a worker system's local partial symbolic execution tree 440 contains a mix of materialized and virtual tree nodes.

Figure 6:
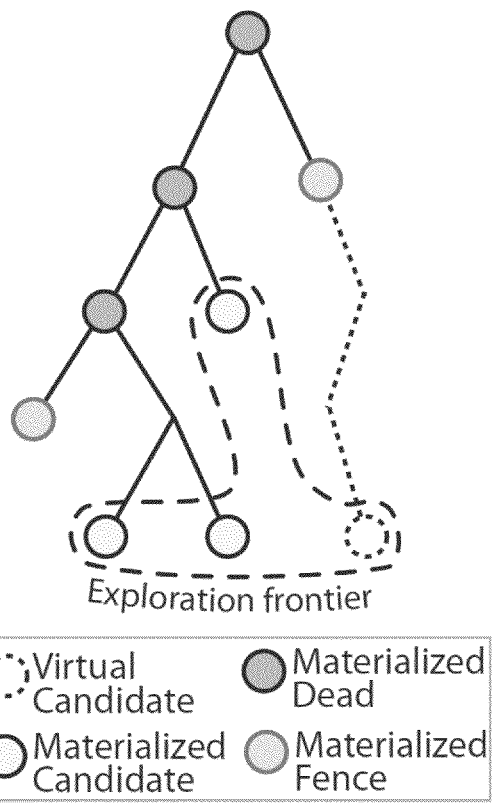
FIG. 6 is a conceptual diagram illustrating an exploration frontier of a worker system's partial symbolic execution tree according to one embodiment.

FIG. 6 is a conceptual diagram illustrating an exploration frontier of a worker system's partial symbolic execution tree according to one embodiment. Specifically, FIG. 6 shows a worker system's partial symbolic execution tree 440. In FIG. 6, the partial symbolic execution tree 440 includes one virtual candidate tree node, three materialized candidate tree nodes, three materialized dead tree nodes, and four materialized fence tree nodes. The exploration frontier is shown by a dotted line that encloses the one virtual candidate tree node and the three materialized candidate tree nodes.

Recall that a worker system 130 can receive an initial seed job from the load balancing system 120. In this situation, which is separate from receiving a job transfer request, the initial seed job is in the same format as a "regular" job transferred between worker systems 130. Specifically, the initial seed job is a path to a specific tree node in the symbolic execution tree. In one embodiment, the initial seed job is an empty path, which refers to the root tree node of the symbolic execution tree. When the first worker system 130 receives the initial seed job, the worker system's symbolic execution module 490 replays the seed job until the symbolic execution module 490 obtains the starting tree node (i.e., the root tree node).

If a job is transferred from one worker system 130 to another, the replay done during materialization must successfully reconstruct the transferred state. Along the reconstruction path, the destination must execute the same instructions, obtain the same symbolic memory content, and receive the same results during constraint solving as on the source worker system. Failing to do so causes the replayed path to be "broken" (i.e., the path either diverges or terminates prematurely). In both cases, this means the state cannot be reconstructed, and this can affect exploration completeness.

One challenge is that a symbolic execution module 490 based on an underlying KLEE symbolic execution engine (SEE) relies on a global memory allocator to service the target program's malloc( ) calls. The allocator returns actual host memory addresses, which is necessary for executing external system calls that access target program state. Unfortunately, this means that buffers are allocated at addresses whose values for a given state depend on the history of previous allocations in other states. Such cross-state interference leads to frequent broken replays.

In one embodiment, the symbolic execution module's KLEE allocator is replaced with a per-state deterministic memory allocator, which uses a per-state address counter that increases with every memory allocation. To preserve the correctness of external calls (that require real addresses), this allocator gives addresses in a range that is also mapped in the SEE address space using the memory space allocator of the host operating system (e.g., POSIX's mmap( )). Thus, before external calls are invoked, the memory content of the state is copied into the mmap-ed region.

The candidate node selection module 485 determines a next candidate tree node to explore. At an exploration processing step, the candidate node selection module 485 determines which candidate tree node to explore next. This determination is guided by a strategy. Since the set of candidate tree nodes can include both materialized and virtual tree nodes, it is possible for the strategy to determine a virtual tree node as the next one to explore. If this happens, then the corresponding path in the partial symbolic execution tree 440 is replayed (i.e., the symbolic execution module 490 executes that path). At the end of this replay, all tree nodes along the path are dead, except the leaf tree node, which has been converted from virtual to materialized and is now ready to be explored. Note that, while exploring the chosen job path, each branch produces child program states. Any such state that is not part of the path is marked as a fence tree node because it represents a tree node that is being explored elsewhere (so, $W_d$ should not pursue it).

In summary, a tree node N in worker system $W_i$'s partial symbolic execution tree 440 has two attributes: $N^{status} \epsilon$ {materialized, virtual} and $N^{life} \epsilon$ {candidate, fence, dead}. A worker system's frontier $F_i$ is the set of all candidate tree nodes on worker system $W_i$. The worker system can explore only tree nodes in $F_i$ (i.e., dead tree nodes are off-limits and so are fence tree nodes, except if a fence tree node needs to be explored during the replay of a job path). The union of $F_i$ equals the frontier of the global execution tree, ensuring that the aggregation of worker-level explorations is complete. The intersection of Fi={ } (the empty set), thus avoiding redundancy by ensuring that worker systems 130 explore disjoint partial trees.

Figure 7:
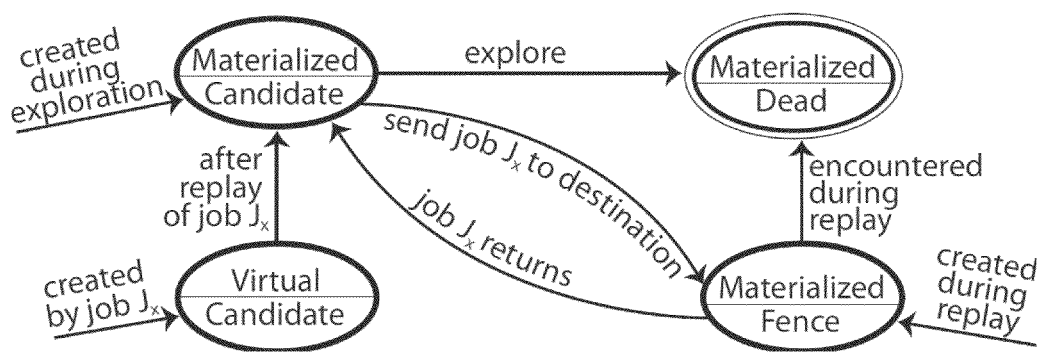
FIG. 7 is a conceptual diagram illustrating state transitions for a tree node in a worker system's partial symbolic execution tree according to one embodiment.

FIG. 7 is a conceptual diagram illustrating state transitions for a tree node in a worker system's partial symbolic execution tree according to one embodiment. In FIG. 7, four states are shown: materialized candidate, virtual candidate, materialized dead, and materialized fence. FIG. 7 summarizes the life cycle of a tree node. As indicated in FIG. 7, once a tree node is dead, it has reached a terminal state. Therefore, a dead tree node's state can be safely discarded from memory. This enables a worker system 130 to maintain program states for only candidate tree nodes and fence tree nodes. In one embodiment, judicious use of copy-on-write and a novel state-encoding technique ensure that actual target program state is maintained for only candidate tree nodes and fence tree nodes.

The symbolic execution module 490 symbolically executes a target program. For example, the symbolic execution module 490 symbolically executes the target program 420 according to the test 430. In one embodiment, the symbolic execution module 490 includes a symbolic execution engine (SEE) based on the KLEE symbolic execution tool (specifically, KLEE's single-computing-node symbolic execution engine).

The failure information module 495 gathers information regarding a failure (e.g., a "bug"). For example, if a bug is encountered during symbolic execution of a target program, the failure information module 495 computes the target program inputs, the thread schedule, and the system call returns that would take the target program to that bug. In one embodiment, the failure information module 495 uses KLEE's cache mechanism for constraint-solving results. This constraint cache can significantly improve constraint solver performance. In the environment 100, states are transferred between worker systems 130 without the source worker's constraint cache. While one might expect this to hurt performance significantly, in practice the necessary portion of the constraint cache is mostly reconstructed as a side effect of path replay, as the path constraints are re-sent to the local constraint solver.

Figure 8:
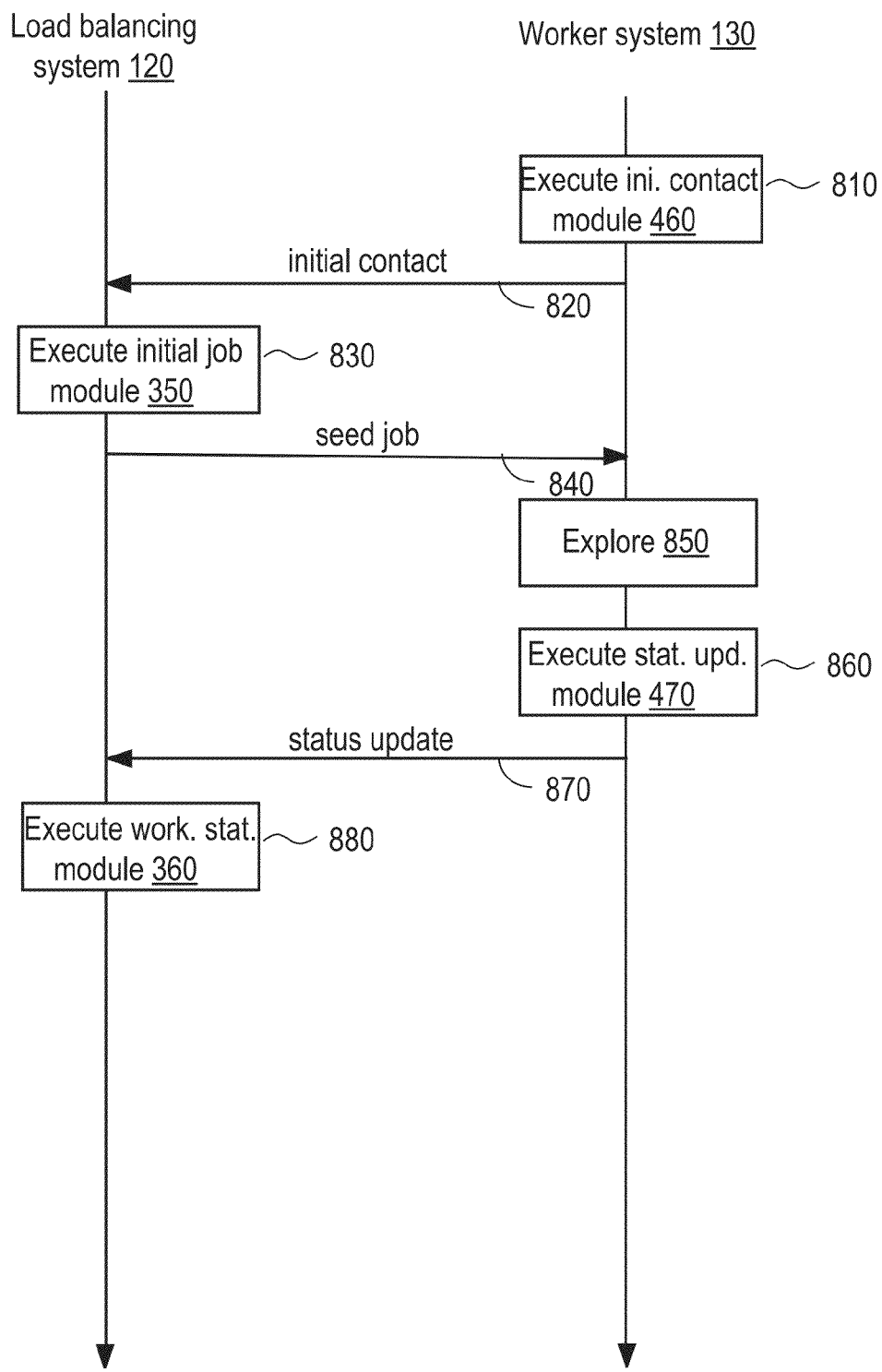
FIG. 8 is a sequence diagram illustrating steps involved in a load balancing system sending a seed job and a worker system sending a status update according to one embodiment.

FIG. 8 is a sequence diagram illustrating steps involved in a load balancing system sending a seed job and a worker system sending a status update according to one embodiment. Before FIG. 8 starts, a load balancing system 120 starts execution. In step 810, a worker system 130 executes the initial contact module 460 for initially contacting the load balancing system 120. This causes the worker system 130 to contact the load balancing system 120 in step 820, thereby creating a new cluster. This contact is the first time that the load balancing system 120 has been contacted by any worker system 130 since the load balancing system 120 started executing. In response to receiving the contact, the load balancing system 120 executes the initial job module 350 in step 830 for sending an initial "seed" job to the worker system 130. This causes the load balancing system 120 to send a seed job to the worker system 130 in step 840. In step 850, the worker system 130 starts exploring the entire symbolic execution tree (i.e., symbolically executing a target program according to a test). In step 860, the worker system 130 executes the status update module 470 for sending a status update to the load balancing system 120. This causes the worker system 130 to send a status update to the load balancing system 120 in step 870. In response to receiving the status update, the load balancing system 120 executes the worker statistics module 360 in step 880 for storing worker system statistics.

Figure 9:
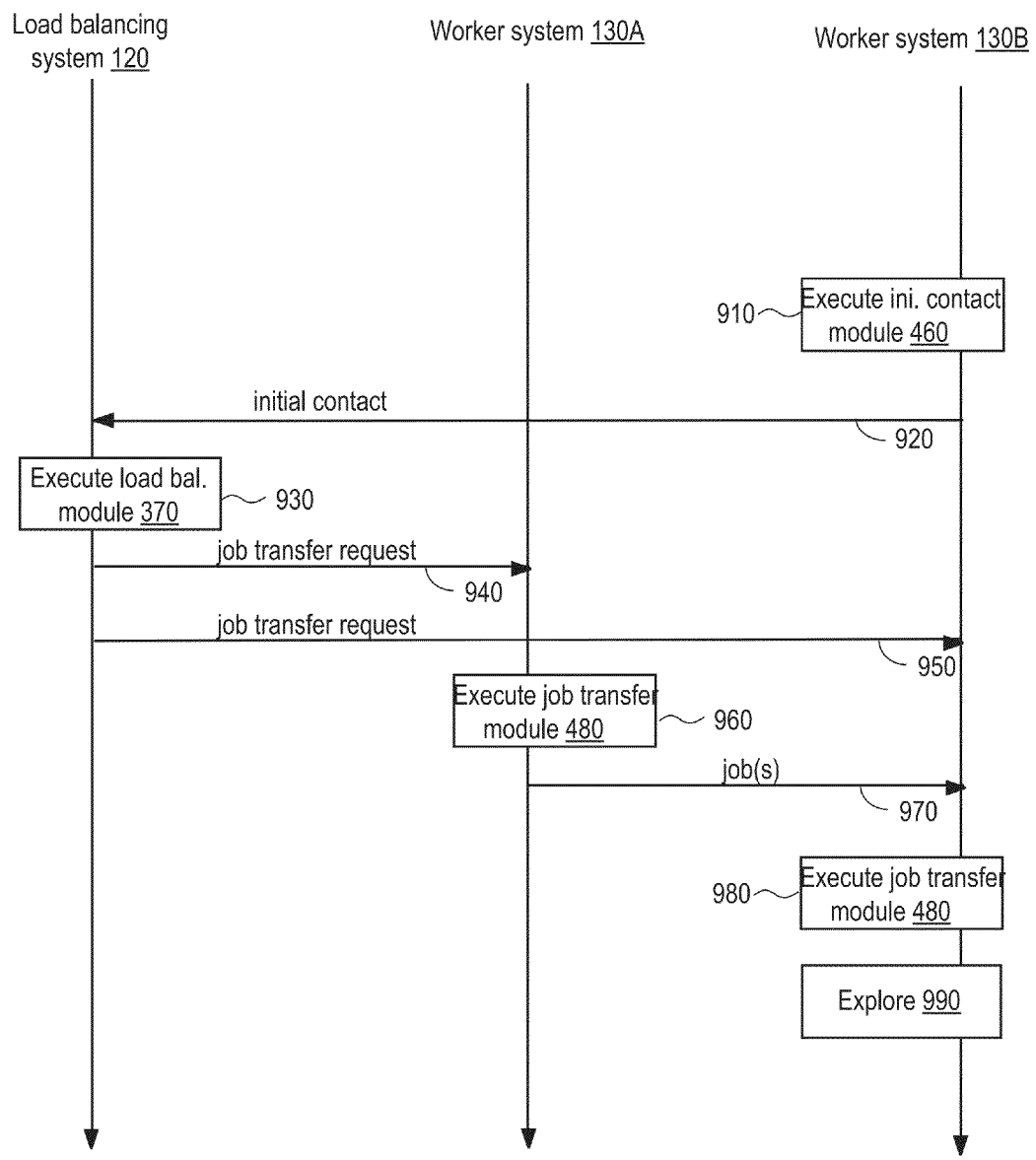
FIG. 9 is a sequence diagram illustrating steps involved in load balancing the symbolic execution of a target program using distributed exploration according to one embodiment.

FIG. 9 is a sequence diagram illustrating steps involved in load balancing the symbolic execution of a target program using distributed exploration according to one embodiment. Before FIG. 9 starts, a load balancing system 120 and a worker system 130A start execution. The load balancing system 120 is managing a cluster that includes the worker system 130A, and the worker system 130A is exploring the entire symbolic execution tree (i.e., symbolically executing a target program according to a test). In step 910, a worker system 130B executes the initial contact module 460 for initially contacting the load balancing system 120. This causes the worker system 130B to contact the load balancing system 120 in step 920, thereby joining the existing cluster. In step 930, the load balancing system 120 executes the load balancing module 370 for instructing pairs of worker systems 130 to balance each other's workloads. This causes the load balancing system 120 to send a job transfer request to the worker system 130A in step 940 and to send a job transfer request to the worker system 130B in step 950. In step 960, the worker system 130A executes the job transfer module 480 for sending an exploration job. This causes the worker system 130A to send one or more exploration jobs to the worker system 130B in step 970. In step 980, the worker system 130B executes the job transfer module 480 for receiving an exploration job. This causes the worker system 130B to start exploring a partial symbolic execution tree 440 in step 990. In this way, worker system 130A breaks off some of its unexplored partial trees and sends them to worker system 130B in the form of jobs. Worker system 130B then balances worker system 130A's workload. As additional worker systems 130 join the cluster, the load balancing system 120 has them balance the workload of worker systems 130 that are already members of that cluster.

Modeling Target Program's Environment

Described above was an environment 100 for parallel symbolic execution of a target program. One challenge with symbolic execution is mediating between a target program and its environment (i.e., symbolically executing a target program that calls into libraries and/or the operating system (OS) or communicates with other systems, neither of which executes symbolically). Real-world systems interact heavily with the environment in varied and complex ways (e.g., through system calls and library calls) and can communicate with other parties (e.g., over sockets, interprocess communication (IPC), and shared memory). For a symbolic execution tool to be used in practice, the tool must be capable of handling these interactions.

In one embodiment, the symbolic execution module 490 allows a call from a target program to go through into the "concrete" environment (e.g., to write a file). Unfortunately, this causes the target program's environment to be altered for all forked executions being explored in parallel, thus introducing inconsistency.

In another embodiment, the symbolic execution module 490 replaces the target program's real environment with a symbolic model (i.e., a piece of code linked with the target program that provides the illusion of interacting with a symbolically executing environment). Specifically, the real environment is replaced with a quasi-complete symbolic model that adheres to the Portable Operating System Interface for Unix (POSIX) family of standards and that makes it possible to use symbolic execution on real-world systems. This symbolic model of a target program's environment supports major aspects of the POSIX interface, including processes, threads, synchronization, networking, IPC, and file input/output (I/O). This symbolic model is sufficiently accurate and complete to enable the testing of complex, real software.

Environment Model Design—

The goal of a symbolic model is to simulate the behavior of a real execution environment while maintaining the necessary symbolic state behind the environment interface. A symbolic execution engine (SEE) can then seamlessly transition back and forth between the target program and the environment. Also, symbolic execution with a model can be substantially faster than without. Requirements that complicate a real environment/OS implementation, such as performance and extensibility, can be ignored in a symbolic model.

In one embodiment, a "symbolic system call" interface to the symbolic execution module's SEE provides the building blocks for thread context switching, address space isolation, memory sharing, and sleep operations. These features are difficult to provide solely through an external model. Symbolic system calls are further described below with reference to "symbolic engine modifications."

In some cases, it is practical to have the host OS handle parts of the environment via external calls. These are implemented by concretizing the symbolic parameters of a system call before invoking it from symbolically executing code. The symbolic execution module 490 allows external calls for only stateless or read-only system calls, such as reading a system configuration file. This restriction ensures that external concrete calls do not alter other symbolically executing paths.

Figure 10:
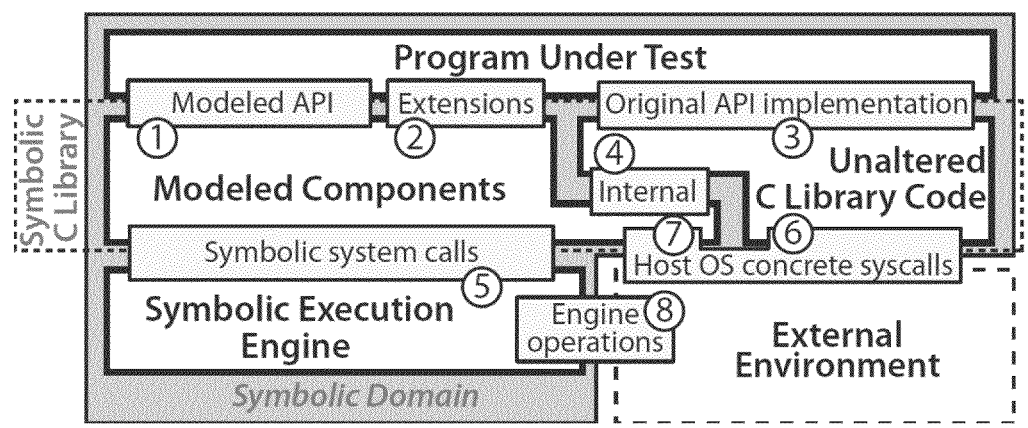
FIG. 10 is a high-level block diagram illustrating the architecture of the symbolic execution module's POSIX model, according to one embodiment.

The symbolic execution module 490 builds upon the KLEE symbolic execution engine, and so the symbolic execution module 490 inherits from KLEE the mechanism for replacing parts of the C Library with model code. The symbolic execution module 490 also inherits the external calls mechanism. The symbolic execution module 490 adds the symbolic system call interface and replaces parts of the C Library with the POSIX model. The resulting architecture is shown in FIG. 10. FIG. 10 is a high-level block diagram illustrating the architecture of the symbolic execution module's POSIX model, according to one embodiment.

Before symbolic execution starts, the target program is linked with a special symbolic C Library. This library resembles a standard C library, except for some parts that were replaced with the corresponding POSIX model code. The code of the target program need not be modified in any way to enable it to use the POSIX model.

Referring to FIG. 10, in the C Library, operations related to threads, processes, file descriptors, and network operations were replaced with their corresponding model (1), and the API was augmented with specific extensions (2). A large portion of the C Library was reused, since it worked without modification (3) (e.g., any API calls that were implemented solely in user space, without requiring direct operating system support, such as memory and string operations). Finally, parts of the original C Library itself use the modeled code (4) (e.g., Standard I/O stdio relies on the modeled POSIX file descriptors).

The modeled POSIX components interface with the SEE through symbolic system calls (5), listed in Table 1 below. Occasionally, the unmodified part of the C Library invokes external system calls (6), and the model code itself needs support from the host OS (7). To make sure the external calls do not interfere with the symbolic engine's own operations (8), such access is limited to read-only and/or stateless operations. This avoids problems like, for instance, allowing an external close( ) system call to close a network connection or log file that is actually used by the SEE itself.

TABLE 1

Primitives used to build the POSIX model

| Primitive Name | Description |
| --- | --- |
| cloud9_make_shared | Share object across a copy-on write (CoW) domain |
| cloud9_thread_create cloud9_thread_terminate | Create and destroy threads |
| cloud9_process_fork cloud9_process_terminate | Fork and terminate the current process |
| cloud9_get_context | Get the current context (pid and tid) |
| cloud9_thread_preempt | Preempt a thread |
| cloud9_thread_sleep | Thread sleep on waiting queue |
| cloud9_thread_notify | Wake threads from waiting queue |
| cloud9_get_wlist | Create a new waiting queue |

Symbolic Engine Modifications—

To support the POSIX interface, the symbolic execution module's symbolic execution engine should provide support for multiple address spaces (to emulate processes) and offer a mechanism to enable the control of thread scheduling. This functionality is accessed by model code through the symbolic system call interface (see Table 1). Additional models of non-POSIX environments can be built using this interface. For example, the interface enables one to build any user-facing API (such as the Microsoft Windows API or a GPU environment such as OpenCL or CUDA). These APIs can be modeled on top of the symbolic system call interface.

If KLEE's symbolic execution module is used, then KLEE is augmented with multiple address spaces per state and support for scheduling threads and processes. KLEE uses copy-on-write (CoW) to enable memory sharing between symbolic states. This functionality is extended in two ways. First, multiple address spaces are enabled within a single execution state, corresponding to multiple processes encompassed in that state. Address spaces can thus be duplicated both across states (as in classic KLEE) and within a state, when cloud9_process_fork is invoked (e.g., as used by the POSIX model's fork( )).

Second, the address spaces in an execution state are organized as CoW domains that permit memory sharing between processes. A memory object can be marked as shared by calling cloud9_make_shared. The memory object is then automatically mapped in the address spaces of the other processes within the CoW domain. Whenever a shared object is modified in one address space, the new version is automatically propagated to the other members of the CoW domain. The shared memory objects can then be used by the model as global memory for inter-process communication.

Threads are created in the currently executing process by calling cloud9_thread_create. The POSIX threads (pthreads) model makes use of this primitive in its own pthread_create( ) routine.

A cooperative scheduler is implemented. An enabled thread runs uninterrupted (atomically), until either (a) the thread goes to sleep; (b) the thread is explicitly preempted by a cloud9_thread_preempt call; or (c) the thread is terminated via symbolic system calls for process/thread termination. Preemption occurs at explicit points in the model code, but it is straightforward to extend the symbolic execution module 490 to automatically insert preemption calls at instruction level (as would be necessary, for instance, when testing for race conditions).

When cloud9_thread_sleep is called, the SEE places the current thread on a specified waiting queue, and an enabled thread is selected for execution. Another thread may call cloud9_thread_notify on the waiting queue and wake up one or all of the queued threads.

The symbolic execution module 490 can be configured to schedule the next thread deterministically, or to fork the execution state for each possible next thread. The latter case is useful when looking for concurrency bugs, but it can be a significant source of path explosion, so it should be disabled when not needed.

If no thread can be scheduled when the current thread goes to sleep, then a hang is detected, the execution state is terminated, and a corresponding test case is generated.

Note that parallelizing symbolic execution is orthogonal to providing the multithreading support described above. In the former case, the execution engine is instantiated on multiple machines and each instance expands a portion of the symbolic execution tree. In the latter case, multiple symbolic threads are multiplexed along the same execution path in the tree. Execution is serial along each path.

POSIX Model Implementation—

The POSIX model uses shared memory structures to keep track of all system objects (processes, threads, sockets, etc.). The two most important data structures are stream buffers and block buffers, analogous to character and block device types in UNIX. Stream buffers model half-duplex communication channels. They are generic producer-consumer queues of bytes, with support for event notification to multiple listeners. Event notifications are used, for instance, by the polling component in the POSIX model. Block buffers are random-access, fixed-size buffers, whose operations do not block; they are used to implement symbolic files.

The symbolic execution engine maintains only basic information on running processes and threads: identifiers, running status, and parent-child information. However, the POSIX standard mandates additional information, such as open file descriptors and permission flags. This information is stored by the model in auxiliary data structures associated with the currently running threads and processes. The implementations of fork( ) and pthread_create( ) are in charge of initializing these auxiliary data structures and making the appropriate symbolic system calls.

Modeling synchronization routines is simplified by the cooperative scheduling policy. No locks are necessary, and all synchronization can be done using the sleep/notify symbolic system calls, together with reference counters. FIG. 11 illustrates the simplicity this engenders in the implementation of pthread mutex lock and unlock. FIG. 11 is a listing of C code illustrating an example implementation of pthread mutex operations in the POSIX environment model.

The POSIX model inherits most of the semantics of the file model from KLEE. In particular, one can either open a symbolic file (its contents comes from a symbolic block buffer) or a concrete file, in which case a concrete file descriptor is associated with the symbolic one, and all operations on the file are forwarded as external calls on the concrete descriptor.

Figure 12:
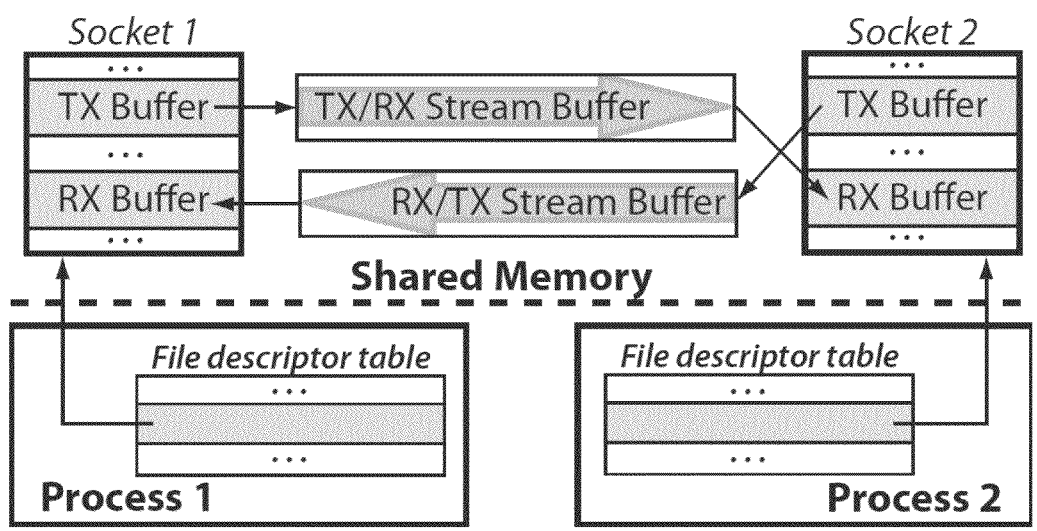
FIG. 12 is a high-level block diagram illustrating a TCP network connection modeled using TX and RX buffers implemented as stream buffers, according to one embodiment.
Figures 13A, 13B:
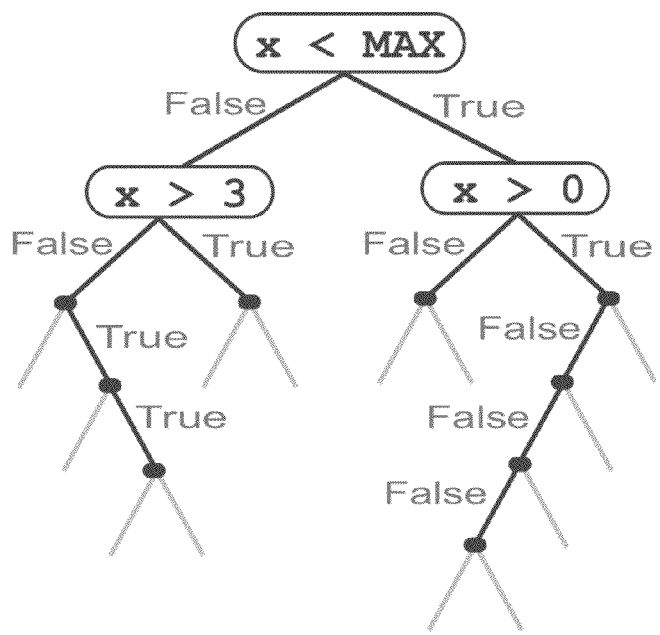
FIG. 13A is a listing of pseudocode illustrating an example of a target program.
FIG. 13B is a symbolic execution tree corresponding to the listing of pseudocode in FIG. 13A.

In addition to file objects, the POSIX model adds support for networking and pipes. Currently, the TCP and UDP protocols are supported over IP and UNIX network types. Since no actual hardware is involved in the packet transmission, the entire networking stack can be collapsed into a simple scheme based on two stream buffers (see FIG. 12). FIG. 12 is a high-level block diagram illustrating a TCP network connection modeled using TX and RX buffers implemented as stream buffers, according to one embodiment. The network is modeled as a single-IP network with multiple available ports. This configuration is sufficient to connect multiple processes to each other, in order to simulate and test distributed systems. The model also supports pipes through the use of a single stream buffer, similar to sockets.

The POSIX model supports polling through the select( ) interface. The select( ) model relies on the event notification support offered by the stream buffers that are used in the implementation of blocking I/O objects (e.g., sockets and pipes).

The constraint solver operates on bit vectors. As a result, symbolic formulas refer to contiguous areas of memory. To reduce the constraint solving overhead, the amount of intermixing of concrete and symbolic data in the same memory region is reduced. The POSIX model segregates concrete from symbolic data by using static arrays for concrete data and linked lists (or other specialized structures) for symbolic data. Potentially-symbolic data passed by the tested program through the POSIX interface is allocated into separate buffers.

Platform for Symbolic Testing

Described above was an environment 100 for parallel symbolic execution of a target program. The symbolic execution tests the target program 420 according to a symbolic test 430. One challenge with symbolic execution is using an automated test generator in the context of a development organization's quality assurance processes. To take full advantage of the automated exploration of paths, a testing tool should provide ways to control aspects of the environment. For example, there should be a clean API for injecting failures at the boundary between programs and their environment, a way to control thread schedules, and so on. There should be a way to programmatically orchestrate all environment-related events but doing so should not require deep expertise in the technology behind the testing tools themselves.

In one embodiment, a testing platform is used to write symbolic tests. The testing platform includes an easy-to-use API and primitives that provide a systematic interface for writing symbolic tests. Developers can specify concisely families of inputs and environment behaviors for which to test the target software, without having to understand how symbolic execution works, which program inputs need to be marked symbolic, or how long the symbolic inputs should be. The API enables, for instance, finding errors in bug patches by reproducing environment conditions which otherwise would have been hard or impossible to set up with regular test cases. The testing platform enables developers to write symbolic tests that concisely specify entire families of inputs and behaviors to be tested, thus improving testing productivity. Existing test suites can be used to generate new test cases that capture untested corner cases (e.g., network stream fragmentation). The testing platform enables fine grain control over the behavior being tested, including the injection of faults and the scheduling of threads.

Software products and systems typically have large "handmade" test suites. Writing and maintaining these suites requires substantial human effort. The testing platform reduces this burden, while improving the quality of testing, by offering an easy way to write "symbolic test suites." First, a symbolic test case encompasses many similar concrete test cases into a single symbolic one. Each symbolic test a developer writes is equivalent to many concrete ones. Second, a symbolic test case explores conditions that are hard to produce reliably in a concrete test case, such as the occurrence of faults, concurrency side effects, or network packet reordering, dropping and delay. Furthermore, symbolic test suites can easily cover unknown corner cases, as well as new, untested functionality.

Testing Platform API—

A symbolic testing API (see Tables 2 and 3) enables a symbolic test 430 to programmatically control events in the environment of the target program 420. A symbolic test suite need only include a cloud9.h header file and make the requisite calls.

TABLE 2

| API for setting global behavior parameters | |
|---|---|
| Function Name | Description |
| cloud9_make_symbolic | Mark memory regions as symbolic |
| cloud9_fi_enable cloud9_fi_disable | Enable/disable the injection of faults |
| cloud9_set_max_heap | Set heap size for symbolic malloc |
| cloud9_set_scheduler | Set scheduler policy (e.g., round-robin) |

TABLE 3

| Extended ioctl codes to control environmental events on a per-file-descriptor basis | |
|---|---|
| Extended Ioctl Code | Description |
| SIO_SYMBOLIC | Turns this file or socket into a source of symbolic input |
| SIO_PKT_FRAGMENT | Enables packet fragmentation on this socket (must be a stream socket) |
| SIO_FAULT_INJ | Enables fault injection for operations on this descriptor |

The generality of a test case can be expanded by introducing bytes of symbolic data. This is done by calling cloud9_make_symbolic, a wrapper around klee_make_symbolic, with an argument that points to a memory region. klee_make_symbolic is a primitive provided by KLEE to mark data symbolic. In addition to wrapping this call, several new primitives are added to the testing API (Table 2). Symbolic data can be written to/read from files, can be sent/received over the network, and can be passed via pipes. Furthermore, the SIO_SYMBOLIC ioctl code (Table 3) turns on/off the reception of symbolic bytes from individual files or sockets.

Delay, reordering, or dropping of packets causes a network data stream to be fragmented. Fragmentation can be turned on or off at the socket level using one of the ioctl extensions. Symbolic fragmentation can be used, for example, to prove that a bug fix for a web server was incomplete.

Calls in a POSIX system can return an error code when they fail. Most programs can tolerate such failed calls, but even high-quality production software misses some. Such error return codes are simulated by the testing platform whenever fault injection is turned on.

The testing platform provides multiple scheduling policies that can be controlled for purposes of testing on a per-code-region basis. Currently, the testing platform supports a round-robin scheduler and two schedulers specialized for bug finding: a variant of the iterative context bounding scheduling algorithm and an exhaustive exploration of all possible scheduling decisions.

Use Case—

Consider a scenario in which one wants to test the support for a new X-NewExtension HTTP header, just added to a web server. Tests for this new feature can be written as follows:

A symbolic test suite typically starts off as an augmentation of an existing test suite. In this scenario, the existing boilerplate setup code is reused, and a symbolic test case is written that marks the extension header symbolic. Whenever the code that processes the header data is executed, the symbolic execution engine forks at all the branches that depend on the header content. Similarly, the request payload can be marked symbolic to test the payload-processing part of the system:
char hData[10];
cloud9_make_symbolic(hData);
strcat(req, "X-NewExtension:");
strcat(req, hData);

The web server may receive HTTP requests fragmented in a number of chunks, returned by individual invocations of the read( ) system call. The web server should run correctly regardless of the fragmentation pattern. To test different fragmentation patterns, one simply enables symbolic packet fragmentation on the client socket: ioctl(ssock, SIO_PKT_FRAGMENT, RD);

To test how the web server handles failures in the environment, one can selectively inject faults when the server reads or sends data on a socket by placing in the symbolic test suite calls of the form:
ioctl(ssock, SIO_FAULT_INJ, RD|WR);
Fault injection can be enabled/disabled globally for all file descriptors within a certain region of the code using calls to cloud9_fi_enable and cloud9_fi_disable. For simulating low-memory conditions, a cloud9_set_max_heap primitive can be used to test the web server with different maximum heap sizes.

Strategy Portfolios

Described above was an environment 100 for parallel symbolic execution of a target program. Recall that the exploration coordination module 380 coordinates worker system-level explorations, and global strategies are implemented in the environment 100 using a strategy interface for building "overlays" on the execution tree structure. Since the search space in symbolic execution is roughly exponential in the size of the program (and potentially infinite), it is helpful to devise a strategy to explore only the relevant subset of paths that are likely to lead to the exploration goal (e.g., code coverage or uncovering new bugs). In practice, the available strategies are heuristics whose efficiencies are unknown a priori and vary across target programs.

In one embodiment, explorations based on different strategies are executed simultaneously, and the results obtained independently by the explorations are then combined (e.g., by collecting all bugs found and/or aggregating all the coverage information). This approach is referred to as a "strategy portfolio." In one embodiment, the strategy portfolio approach is characterized by one or more of the following features:

1. Inspired by the Modern Portfolio Theory, a strategy portfolio is a "composite" strategy, where multiple member strategies maintain independent queues of states, and each member strategy selects one state to explore next. This portfolio of concurrent strategies can be thought of in analogy to financial investment portfolios. If a strategy is a stock, worker systems represent cash, and the portfolio's return is measured in results per unit of time, then the problem is allocating cash to stocks so as to maximize overall return. By casting the exploration problem as an investment portfolio optimization problem, portfolio theory results can be reused, such as diversification and speculation, as well as quantitative techniques for improving returns, such as efficient frontier and alpha/beta coefficients. For example, a small number of worker systems can be speculatively devoted to a strategy that works exceptionally well but for only a small fraction of programs. Running this exploration on a copy of the execution tree in parallel with a classic strategy that bears less risk may improve the expected time of reaching the overall goal.

2. Each strategy starts from the same initial state of the system, but the execution tree and state queue evolve differently (and independently) under each strategy.

3. The strategies run in parallel. One can imagine this as the "composite" strategy selecting an n-tuple of states to explore simultaneously, rather than one at a time. Each state in the tuple corresponds to the selection of each member strategy.

4. In a goal-oriented exploration, if any of the states in the n-tuple matches the exploration goal, the exploration ends. In a coverage-oriented exploration, the exploration progress of each state in the n-tuple is aggregated into a global composite progress.

5. A strategy portfolio benefits from diversification. For each target program, the performance of the portfolio is better than the maximum performance of its individual components.

6. A strategy portfolio offers parallelization opportunities. Each strategy member in the portfolio can run on separate computing resources (either single-computing-node or an instance of environment 100), thus offering trivial parallelism.

When the strategy portfolio approach is used, different information is stored in the load balancing system's repository 300. For example, rather than storing only one worker statistics repository 320, multiple worker statistics repositories are stored (one for each strategy, containing information regarding the worker systems 130 executing that strategy). A global work progress repository is also stored, which includes work progress information over the entire cluster (e.g., a bit vector representing overall code coverage for the entire cluster).

Additional information is stored in the worker system's repository 400. For example, a strategy is stored. The strategy instructs the worker system 130 regarding how to determine which candidate tree node to explore next.

Figure 14:
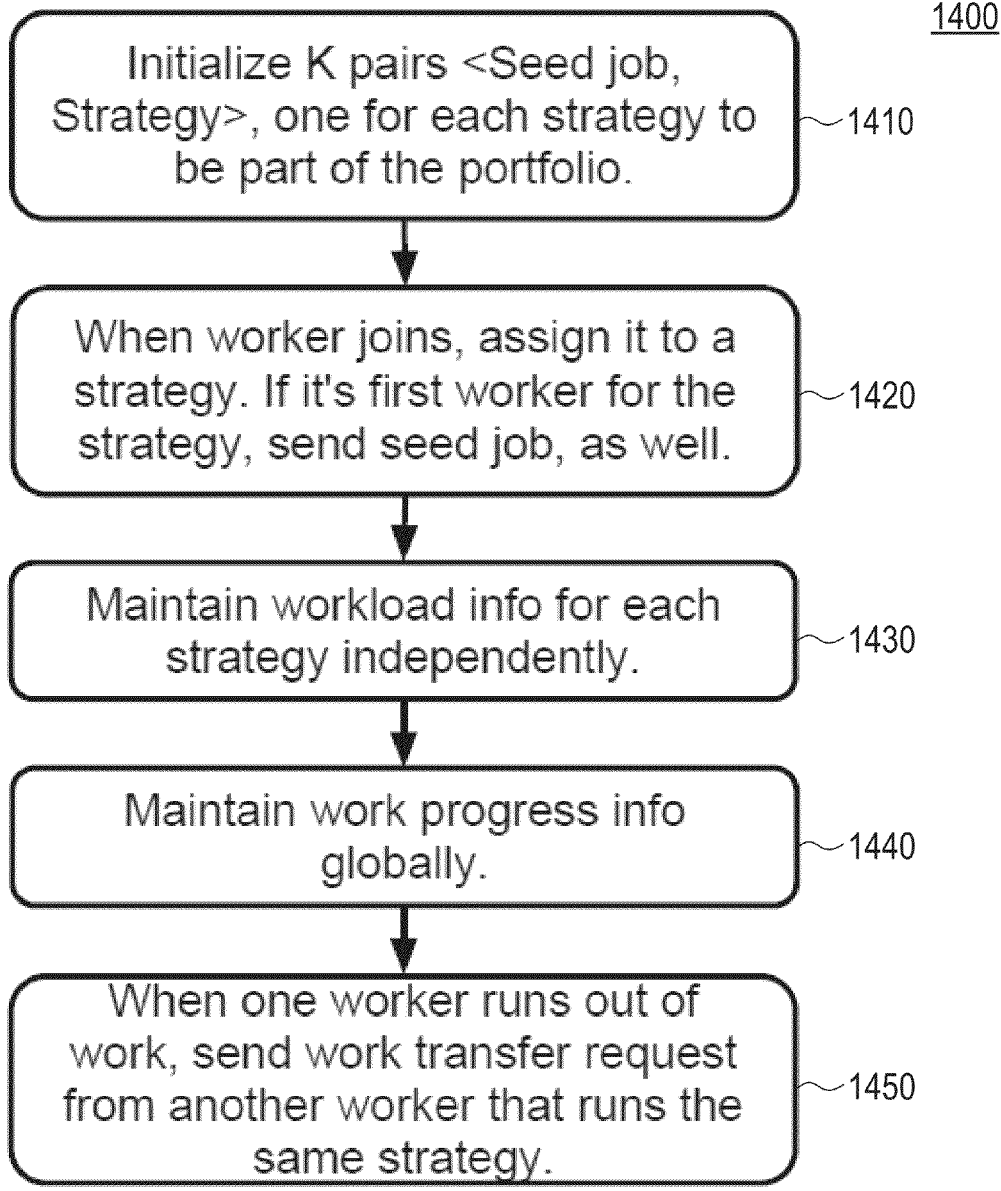
FIG. 14 is a flowchart illustrating a method of managing a strategy portfolio according to one embodiment.

FIG. 14 is a flowchart illustrating a method 1400 of managing a strategy portfolio according to one embodiment. In the illustrated embodiment, the strategy portfolio includes K strategies. In one embodiment, the method 1400 is executed by the load balancing system 120.

In step 1410, K pairs are initialized. Each pair includes one seed job and one exploration strategy. One pair is initialized for each strategy that is part of the strategy portfolio.

In step 1420, in response to a worker system 120 joining the cluster, that worker system is assigned a strategy, and appropriate instructions are sent to the worker system. If that worker system 120 is the first worker system to be assigned a particular strategy, then the appropriate seed job is also sent to the worker system.

In step 1430, workload information is maintained for each strategy independently (e.g., using the multiple worker statistics repositories).

In step 1440, work progress information is maintained globally (e.g., using the global work progress repository).

In step 1450, in response to a first worker system 130A running out of work, a work transfer request is sent that instructs a second worker system 130B (which is executing the same strategy as the first worker system 130A) to send some of its work to the first worker system 130A.

Figure 15:
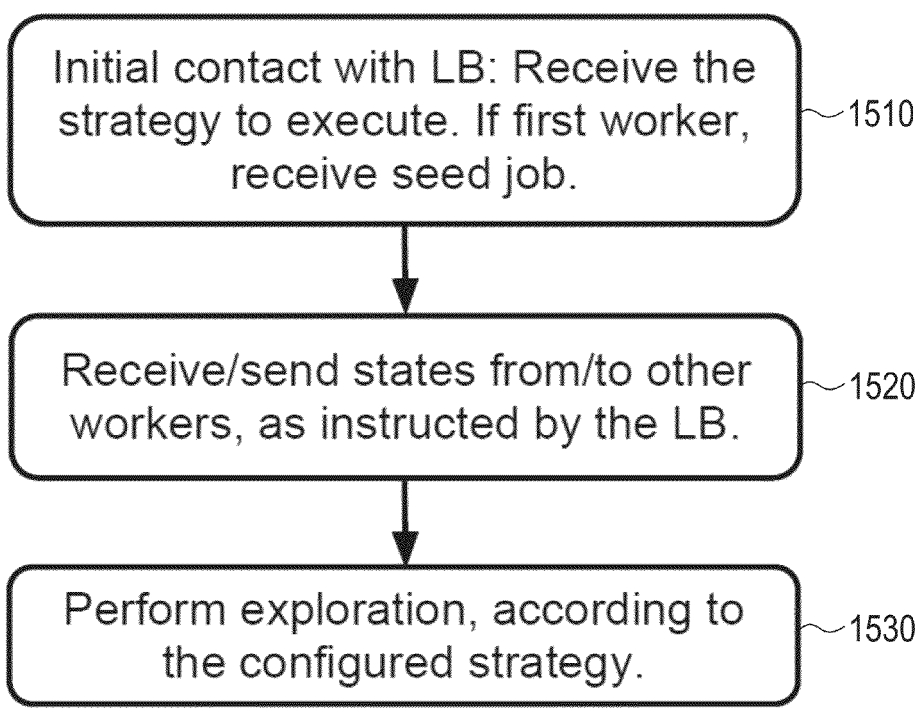
FIG. 15 is a flowchart illustrating a method of executing a portion of a strategy portfolio according to one embodiment.

FIG. 15 is a flowchart illustrating a method 1500 of executing a portion of a strategy portfolio according to one embodiment. In one embodiment, the method 1500 is executed by the worker system 130.

In step 1510, an initial contact is sent to the load balancing system 120. An exploration strategy is then received. If that strategy is being assigned for the first time, then a seed job is also received.

In step 1520, exploration states are received from and/or sent to worker systems 130 (e.g., in response to job transfer requests received from the load balancing system 120).

In step 1530, exploration is performed according to the configured strategy.

Status updates are sent to the load balancing system 120 (not shown). The status updates contain information regarding workload (e.g., length of job queue) and work progress (specific to the configured strategy, such as a bit vector representing code coverage).

Note that the load balancing system 120 partitions a cluster of worker systems 130 into multiple independent teams and assigns a different strategy to each team. Also, an individual worker system 130 is not aware that it is running within a portfolio of strategies, as part of a team. So, the only aspect that changes from the perspective of a worker system 130 is that the worker system no longer executes a pre-determined strategy. Instead, the worker system 130 executes a strategy indicated by the load balancing system 120 when the worker system first joins the cluster and sends an initial contact to the load balancing system.

Note also that the work progress is maintained globally to combine the effects of each strategy and thus obtain the "sum better than individual parts" effect of the portfolio. For instance, one can execute different code coverage strategies on different worker systems 130 and let the load balancing system 120 inform each worker system about the overall code coverage progress. This enables the worker systems 130 to optimize their searches for the remaining uncovered code.

Class-Uniform Path Analysis

The role of the search strategies is to find the best candidate tree node to explore among a (potentially large) pool of states. When a state executes, it may fork at a branching condition, thus adding one more elements to the pool. In practice, forked states tend to share similar traits (for instance, the position in the target program) and then, in a cascading effect, some traits end up dominating the entire pool of states, although the state with less-dominant traits would have also had an important contribution to the exploration.

For example, assume that the trait is the state's target program location. In this case, some points in the program, such as loops, may cause significantly more forks than in the rest of the code. The states inside the loop will keep forking, and they will eventually dominate the entire pool of states. The progress of the states in other parts of the code is slowed down, since those states are selected less frequently.

Strategy portfolios introduce the idea of diversification in the state search space. The performance of the portfolio lies in the choice of its member strategies: the more orthogonal to each other the strategies are, the more effective the portfolio is. However, as more strategy members are added, it becomes increasingly difficult to find a strategy orthogonal to all the others (e.g., that would explore a different portion of the symbolic execution tree). This causes redundancy in the exploration, since the state queues of each member strategy have a higher degree of overlapping.

In one embodiment, the set of available program states is partitioned into multiple classes. States are selected from each class at the same rate (e.g., by picking classes in a round-robin fashion, in a sequential symbolic execution engine). Within each class, states are selected according to an underlying strategy. There can be a single strategy, instantiated for each class, or different strategies for each class. This approach is referred to as class-uniform path analysis (CUPA). CUPA dynamically groups program paths into classes (e.g., based on a developer-specified criterion) and balances analysis resources uniformly across the classes, thus ensuring that all classes of paths in the target program get a fair chance to be explored.

CUPA can be viewed as a heuristic for choosing the paths to explore when the resources (e.g., developer time, CPU, and memory) are limited compared to the size of the search space. CUPA works orthogonally to an exploration search strategy, by splitting the search space into partitions and ensuring that each partition gets the same share of computational resources. By encasing the explosion of states inside a partition, the other states can progress faster to the exploration goal.

Overview—

The effects of path explosion are highly non-uniform. When applying symbolic execution to real-world target programs, it is often the case that path explosion originates primarily from a small set of target program statements, referred to as "hot spots." Hot spots are, for instance, loop headers whose exit conditions depend on symbolic input. Those statements cause the states executing them to fork significantly more often than in the other portions of the code. In effect, the code around that statement is explored over and over again, taking time that could be otherwise used to explore other regions of the program.

When the goal is not to exhaustive explore all paths, the allocation of CPU resources to states becomes important. A naive uniform allocation of computation resources to symbolic states may lead to starvation. For instance, when the goal is to achieve line coverage, the fork points that generate most of the states will dominate the exploration search space. This will prevent states that fork in other points of the program from progressing.

Figure 18:
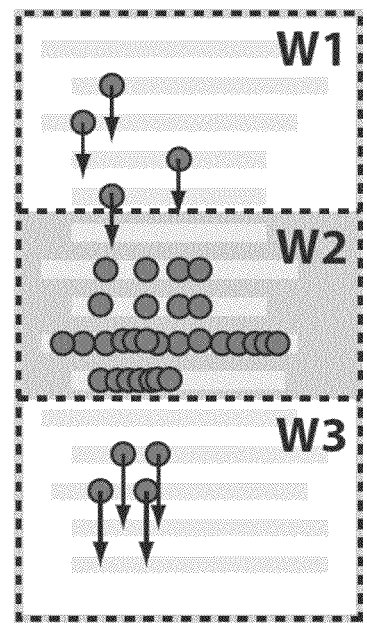
FIG. 18 is a conceptual diagram illustrating effects of partitioning a set of states based on the region they belong to in a target program.

We propose instead to partition the exploration search space according to a criterion relevant for the testing goal. In one embodiment, CUPA is used to optimize the search for code coverage, and states are partitioned according to their fork point in the target program. The exploration process selects one state from each partition in a round-robin fashion, thus ensuring that each partition gets roughly the same amount of resources. FIG. 18 is a conceptual diagram illustrating effects of partitioning a set of states based on the region they belong to in a target program. In FIG. 18, the arrows represent the progress rate of the states. A path explosion "path bomb" in worker $W_2$ locally slows down the progress of each state. However, the regions belonging to $W_1$ and $W_3$ are unaffected, and states advance faster.

Within each partition, another strategy is used to select the next state to explore. It may be any strategy that would also be used in a non-partitioned scenario, such as randomly selecting the next state or weighting state selection according to the estimated proximity to uncovered code.

Within a partition, states can appear and disappear for multiple reasons. When a new state forks, it is first assigned to a corresponding partition. When a state terminates, it is removed from the partition. A state can also transition from one partition to another, as it traverses and forks through the target program.

The net result of applying this partitioning scheme is an increase in the "fluidity" of state exploration, which in turn helps achieve the testing goal faster. The strategy favors the case where there are states advancing in all program regions. The decision of which states to select next within each region is orthogonal to the partitioning strategy and is left to the lower-level state selection heuristics.

Parallelization—

Figure 19:
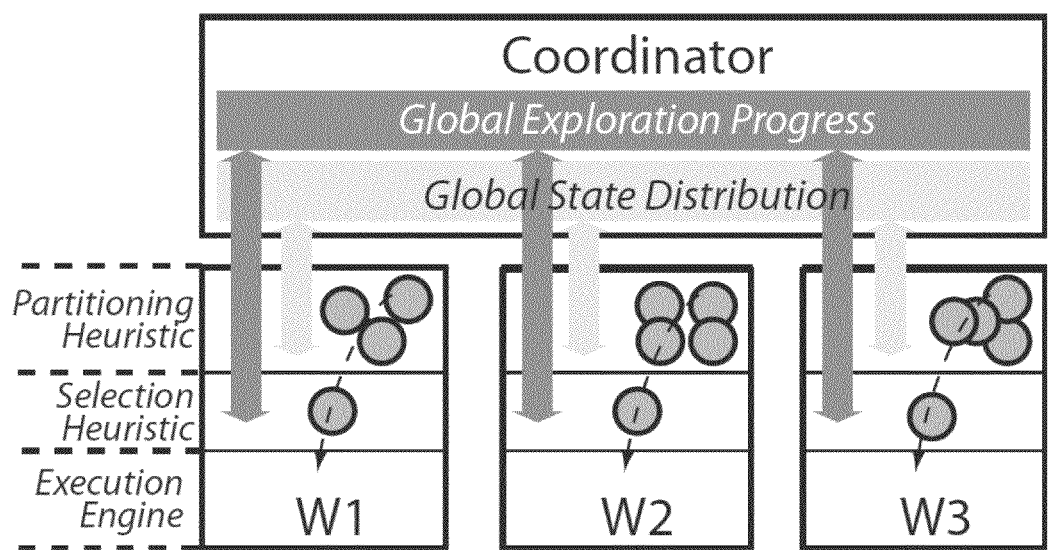
FIG. 19 is a conceptual diagram illustrating a layered organization of search heuristics in the presence of CUPA partitioning.

CUPA scales well in a parallel environment. In one embodiment, each worker system 130 reports to a load balancing system 120 the total number of states per partition (instead of the total number of states on the worker system). The load balancing system 120 then aggregates this information and computes the per-partition distribution of states across worker systems 130. Then, for each partition, the load balancing system 120 performs load balancing by issuing work transfer requests for states belonging to that partition. The resulting two-layered architecture is illustrated in FIG. 19. FIG. 19 is a conceptual diagram illustrating a layered organization of search heuristics in the presence of CUPA partitioning. In FIG. 19, the states under their control are represented by circles. The heuristics may share global information through the load balancing system 120 (the gray arrows).

In effect, the load balancing algorithm ensures that on each partition, the states are evenly distributed across worker systems 130. Since each worker system 130 gives equal weight to each partition, the average CPU resources allocated in the cluster for each partition is uniform.

In one embodiment, the CUPA approach is characterized by one or more of the following features:

1. As program states evolve in the system, they can move from one partition to the other. The strategies of each class are informed on the departure/arrival of a state, in order to be excluded/included in the selection process.

2. A particularly useful partitioning criterion is the location in the target program of the last point a state branched. The rationale is that this partitioning attaches each state to one of the program points where execution states branch. In practice, a few of such branching points are the source of most of the states. (They are, for instance, loop headers depending on symbolic input.) These branching points, referred to as "hot spots," are a major cause of state explosion. By containing such points in classes, and employing CUPA, such "hot spots" are prevented from polluting the selection space.

3. CUPA can be generalized to multiple partitioning schemes executing simultaneously. They can be member strategies in a portfolio or applied in a round-robin fashion on the same queue of states.

4. The CUPA approach is orthogonal to the strategy portfolio approach, since it offers an alternative way of diversification. For example, one can execute independent CUPA-enabled strategies as part of a larger portfolio (and even mixed with other strategies, as well).

5. There is a duality between the CUPA approach and the strategy portfolio approach regarding how workload is split among worker systems 130. A strategy portfolio partitions the worker systems 130 in multiple teams, and load balancing is performed for each team independently. CUPA partitions states into multiple classes, and load balancing is performed for each class independently, across all worker systems 130.

When the CUPA approach is used, different information is stored in the load balancing system's repository 300. For example, rather than storing only one worker statistics repository 320, multiple worker statistics repositories are stored (one for each program state partition class, containing information regarding the worker systems 130 executing that program state partition).

Additional information is stored in the worker system's repository 400. For example, program state partition information is stored. The worker system 130 chooses program states (e.g., candidate tree nodes) from among various partitions. The program state partition information depends on the worker system's configured classification and stores, for each partition, one or more candidate tree nodes assigned to that partition. The worker system's processing server 410 includes an additional module, referred to as a "partition module." The partition module keeps the program state partition information up to date (as stored in the repository 400) and determines which partition to select next. (After the partition is selected, a state (e.g., candidate tree node) is selected from that partition using the candidate node selection module 485.)

Figure 16:
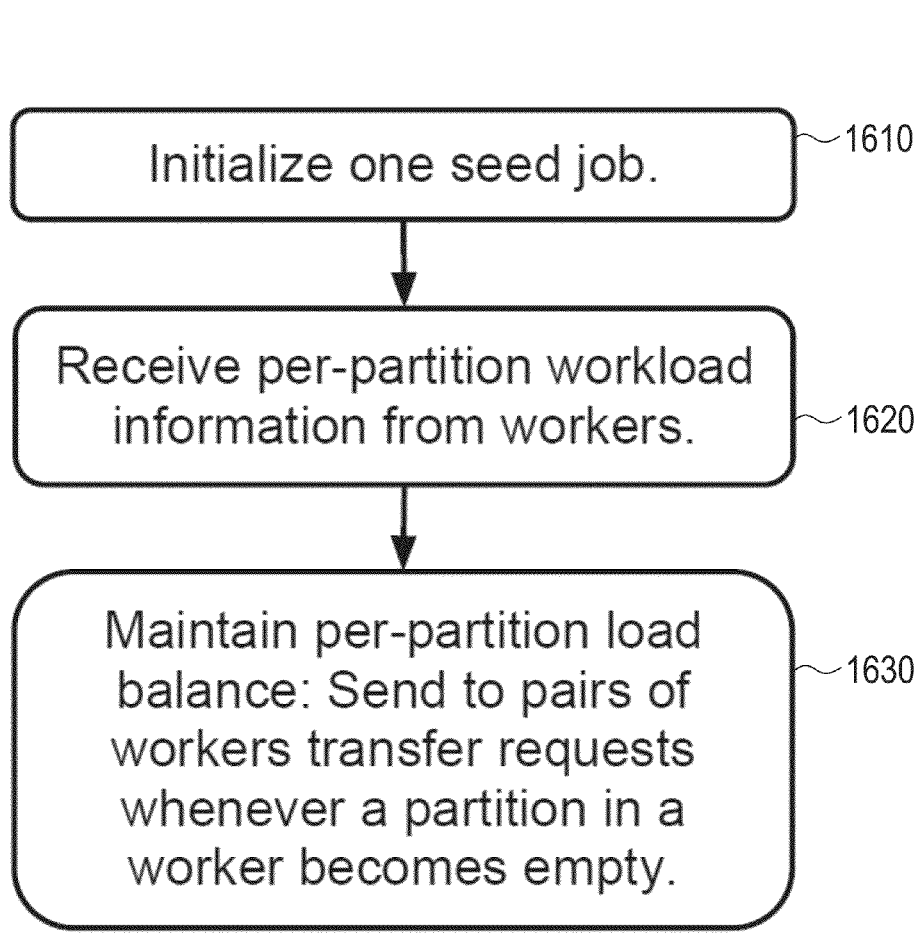
FIG. 16 is a flowchart illustrating a method of managing class-uniform path analysis according to one embodiment.

FIG. 16 is a flowchart illustrating a method 1600 of managing class-uniform path analysis (CUPA) according to one embodiment. In one embodiment, the method 1600 is executed by the load balancing system 120.

In step 1610, a seed job is initialized.

In step 1620, per-partition workload information is received from worker systems 130.

In step 1630, worker systems' workloads are balanced on a per-partition basis. For example, in response to a first worker system 130A's partition becoming empty (e.g., that partition contains zero states), a work transfer request is sent that instructs a second worker system 130B (which is executing the same partition as the first worker system 130A) to send some of its work to the first worker system 130A.

Figure 17:
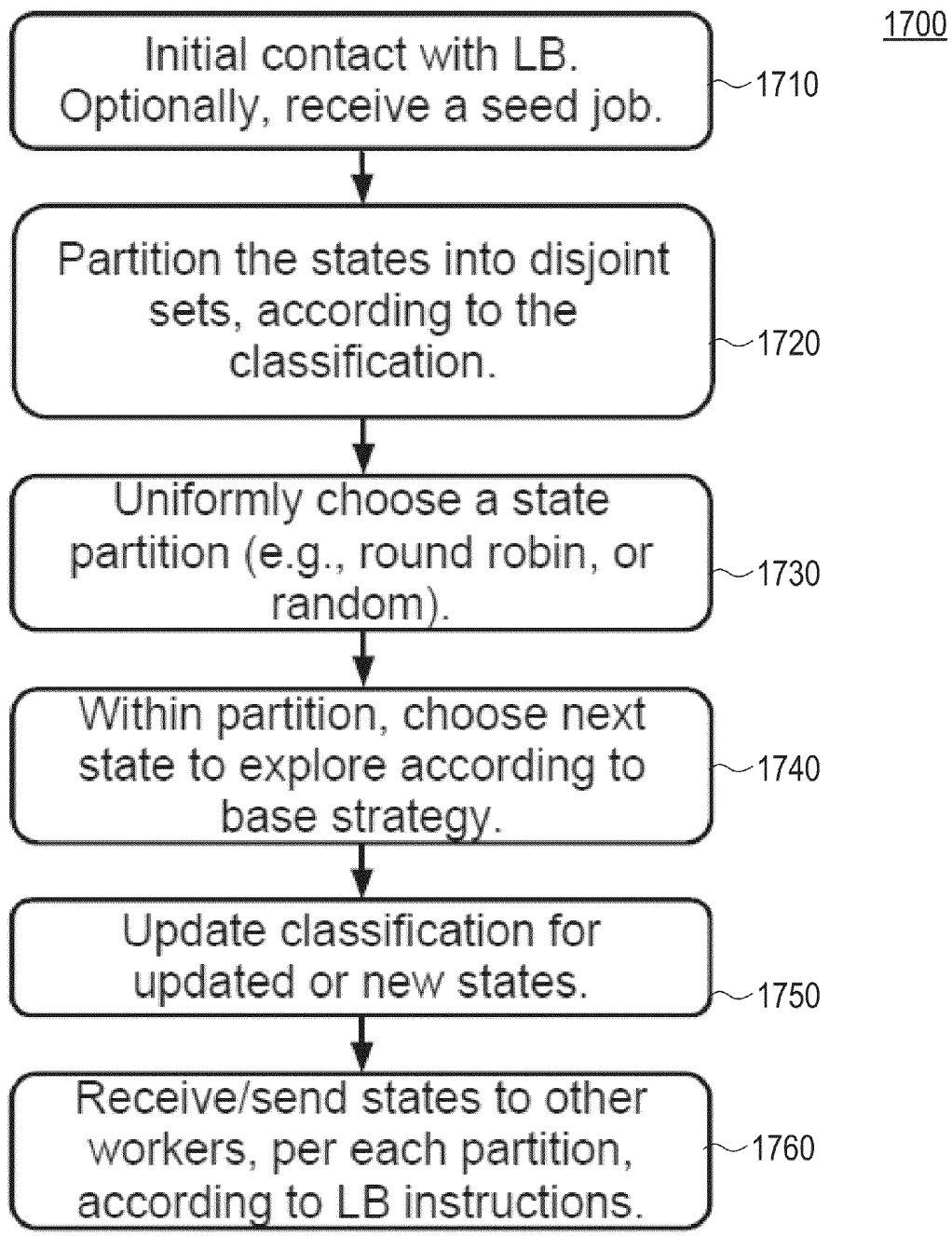
FIG. 17 is a flowchart illustrating a method of executing class-uniform path analysis (CUPA) according to one embodiment.

FIG. 17 is a flowchart illustrating a method 1700 of executing class-uniform path analysis (CUPA) according to one embodiment. In one embodiment, the method 1700 is executed by the worker system 130.

In step 1710, an initial contact is sent to the load balancing system 120. A classification is then received. If this contact is the first time that the load balancing system 120 has been contacted by any worker system 130 since the load balancing system 120 started executing, then the load balancing system 120 sends an initial seed job to the worker system 130, and the worker system 130 receives the seed job.

In step 1720, program states are partitioned into disjoint sets ("partitions") according to the received classification. This program state partition information is stored.

In step 1730, a state partition is selected in a uniform manner (e.g., round-robin or randomly).

In step 1740, a next state to explore (e.g., a candidate tree node) is selected from the partition that was selected in step 1730.

In step 1750, the program state partition information is updated as necessary (e.g., to add new states or change the classifications of existing states).

In step 1760, program states are received from and/or sent to worker systems 130 on a per-partition basis (e.g., in response to job transfer requests received from the load balancing system 120).

Exploration is performed according to the configured classification (not shown). Status updates are sent to the load balancing system 120 (not shown). The status updates contain information regarding workload (e.g., length of job queue) on a per-partition basis.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of testing a target program using a symbolic test, the method comprising:
   creating a symbolic test that specifies a behavior of the target program's environment and a family of target program inputs for which to test the target program, wherein the symbolic test includes a call to a symbolic testing application programming interface (API) and a primitive provided by the symbolic testing API that designates data as being symbolic;
   compiling the symbolic test with the target program; and
   using a symbolic execution engine to execute the compilation of the symbolic test and the target program.

2. A computer-implemented method of exploring a symbolic execution tree, the method comprising:
   partitioning the symbolic execution tree into a set of partial trees such that:
      no two partial trees in the set cover a same execution path;
      the set of partial trees collectively covers all execution paths in the symbolic execution tree; and
      each partial tree in the set contains all information to be explored independently from other partial trees in the set,
   wherein each partial tree comprises one or more nodes, and the partitioning comprises:
      labeling each node in a given partial tree as an internal node, a fence node, or a candidate node, the labeling comprising:
         responsive to a node having been already explored, labeling the node as an internal node;
         responsive to a node demarcating an edge between a first portion of the symbolic execution tree included in the given partial tree and a second portion of the symbolic execution tree included in another partial tree, labeling the node as a fence node; and
         responsive to a node not having been already explored, labeling the node as a candidate node.

3. The method of claim 2, further comprising:
   executing one or more candidate nodes;
   identifying one or more additional nodes based on the executing;
   relabeling the one or more candidate nodes as internal nodes; and
   labeling the one or more additional nodes as candidate nodes.

4. A computer-implemented method of exploring a symbolic execution tree, the method comprising:
   partitioning the symbolic execution tree into a set of partial trees such that:
      no two partial trees in the set cover a same execution path;
      the set of partial trees collectively covers all execution paths in the symbolic execution tree; and
      each partial tree in the set contains all information to be explored independently from other partial trees in the set;
   symbolically executing, by a cluster of machines, the set of partial trees in parallel, each partial tree in the set being handled by a corresponding process executing on one of the machines in the cluster, the symbolic execution scaling linearly by a number of machines in the cluster; and
   executing a work stealing algorithm to determine which processes have run out of work and redistribute work between the processes accordingly.

5. The method of claim 4, further comprising:
   repartitioning the symbolic execution tree to create an additional partial tree, the repartitioning comprising:
      selecting, from among the candidate nodes of an existing partial tree, a set of one or more nodes to transfer;
      relabeling, in the existing partial tree, the nodes to transfer as fence nodes;
      defining a new partial tree including the nodes to transfer;
      labeling, in the new partial tree, the nodes to transfer as candidate nodes;
      replaying execution of the nodes to transfer to reconstruct paths that reach the nodes to transfer in the symbolic execution tree;
      identifying one or more new nodes based on the replaying; and
      labeling the one or more new nodes as fence nodes.

6. The method of claim 4, further comprising:
   selecting one or more candidate nodes from a source partial tree of the set;
   relabeling the selected candidate nodes as fence nodes;
   adding the selected candidate nodes to a destination partial tree of the set; and
   replaying the selected candidate nodes within the destination partial tree.

7. A non-transitory computer-readable storage medium storing executable computer program instructions for exploring a symbolic execution tree, the instructions for performing steps comprising:
   partitioning the symbolic execution tree into a set of partial trees such that:
      no two partial trees in the set cover a same execution path;
      the set of partial trees collectively covers all execution paths in the symbolic execution tree; and
      each partial tree in the set contains all information to be explored independently from other partial trees in the set; and symbolically executing, by a cluster of machines, the set of partial trees in parallel, each partial tree in the set being handled by a corresponding process executing on one of the machines in the cluster, the symbolic execution scaling linearly by a number of machines in the cluster; and executing a work stealing algorithm to determine which processes have run out of work and redistribute work between the processes accordingly.

8. The non-transitory computer-readable storage medium of claim 7, wherein the computer program instructions further comprise instructions for:

executing one or more candidate nodes;

identifying one or more additional nodes based on the executing;

relabeling the one or more candidate nodes as internal nodes; and labeling the one or more additional nodes as candidate nodes.

9. The non-transitory computer-readable storage medium of claim 7, wherein the computer program instructions further comprise instructions for:

repartitioning the symbolic execution tree to create an additional partial tree, the repartitioning comprising:

selecting, from among the candidate nodes of an existing partial tree, a set of one or more nodes to transfer;

relabeling, in the existing partial tree, the nodes to transfer as fence nodes;

defining a new partial tree including the nodes to transfer;

labeling, in the new partial tree, the nodes to transfer as candidate nodes;

replaying execution of the nodes to transfer to reconstruct paths that reach the nodes to transfer in the symbolic execution tree;

identifying one or more new nodes based on the replaying; and labeling the one or more new nodes as fence nodes.

10. The non-transitory computer-readable storage medium of claim 7, wherein the computer program instructions further comprise instructions for:

selecting one or more candidate nodes from a source partial tree of the set;

relabeling the selected candidate nodes as fence nodes;

adding the selected candidate nodes to a destination partial tree of the set; and replaying the selected candidate nodes within the destination partial tree.

11. The non-transitory computer-readable storage medium of claim 7, wherein each partial tree comprises one or more nodes, and the partitioning comprises:

labeling each node in a given partial tree as an internal node, a fence node, or a candidate node, the labeling comprising:

responsive to a node having been already explored, labeling the node as an internal node;

responsive to a node demarcating an edge between a first portion of the symbolic execution tree included in the given partial tree and a second portion of the symbolic execution tree included in another partial tree, labeling the node as a fence node; and responsive to a node not having been already explored, labeling the node as a candidate node.

12. A computer system for exploring a symbolic execution tree, the computer system comprising:

at least one non-transitory computer-readable storage medium storing executable computer program instructions comprising instructions for:

partitioning the symbolic execution tree into a set of partial trees such that:

no two partial trees in the set cover a same execution path;

the set of partial trees collectively covers all execution paths in the symbolic execution tree; and each partial tree in the set contains all information to be explored independently from other partial trees in the set;

symbolically executing, by a cluster of machines, the set of partial trees in parallel, each partial tree in the set being handled by a corresponding process executing on one of the machines in the cluster, the symbolic execution scaling linearly by a number of machines in the cluster; and executing a work stealing algorithm to determine which processes have run out of work and redistribute work between the processes accordingly; and a processor for executing the computer program instructions.

13. The computer system of claim 12, wherein the computer program instructions further comprise instructions for:

executing one or more candidate nodes;

identifying one or more additional nodes based on the executing;

relabeling the one or more candidate nodes as internal nodes; and labeling the one or more additional nodes as candidate nodes.

14. The computer system of claim 12, wherein the computer program instructions further comprise instructions for:

repartitioning the symbolic execution tree to create an additional partial tree, the repartitioning comprising:

selecting, from among the candidate nodes of an existing partial tree, a set of one or more nodes to transfer;

relabeling, in the existing partial tree, the nodes to transfer as fence nodes;

defining a new partial tree including the nodes to transfer;

labeling, in the new partial tree, the nodes to transfer as candidate nodes;

replaying execution of the nodes to transfer to reconstruct paths that reach the nodes to transfer in the symbolic execution tree;

identifying one or more new nodes based on the replaying; and labeling the one or more new nodes as fence nodes.

15. The computer system of claim 12, wherein the computer program instructions further comprise instructions for:

selecting one or more candidate nodes from a source partial tree of the set;

relabeling the selected candidate nodes as fence nodes;

adding the selected candidate nodes to a destination partial tree of the set; and replaying the selected candidate nodes within the destination partial tree.

16. The computer system of claim 12, wherein each partial tree comprises one or more nodes, and the partitioning comprises:

labeling each node in a given partial tree as an internal node, a fence node, or a candidate node, the labeling comprising:

responsive to a node having been already explored, labeling the node as an internal node;

responsive to a node demarcating an edge between a first portion of the symbolic execution tree included in the given partial tree and a second portion of the symbolic execution tree included in another partial tree, labeling the node as a fence node; and responsive to a node not having been already explored, labeling the node as a candidate node.

* * * * *